United States Patent
Corominas

(10) Patent No.: US 7,024,988 B2
(45) Date of Patent: Apr. 11, 2006

(54) PLANT FOR THE CONTINUOUS PROCESSING AND PACKING OF MEAT PRODUCTS

(75) Inventor: Narcis Lagares Corominas, Girona (ES)

(73) Assignee: Metalquimia, S.A., (ES)

( * ) Notice: Subject to any disclaimer, the term of this patent is extended or adjusted under 35 U.S.C. 154(b) by 0 days.

(21) Appl. No.: 10/478,229

(22) PCT Filed: May 18, 2001

(86) PCT No.: PCT/ES01/00195

§ 371 (c)(1),
(2), (4) Date: Aug. 12, 2004

(87) PCT Pub. No.: WO02/094025

PCT Pub. Date: Nov. 28, 2002

(65) Prior Publication Data

US 2005/0034612 A1    Feb. 17, 2005

(51) Int. Cl.
| A23L 1/00 | (2006.01) |
| A22C 9/00 | (2006.01) |
| A22C 17/00 | (2006.01) |
| A22C 18/00 | (2006.01) |

(52) U.S. Cl. ......................... 99/532; 99/535
(58) Field of Classification Search ........... 99/348, 99/352–355, 472, 516, 517, 532–535, 467, 99/487; 426/231–233, 302, 506, 519, 518, 426/520, 524, 281, 641, 644, 645, 646
See application file for complete search history.

(56) References Cited

U.S. PATENT DOCUMENTS

| 4,029,824 | A | * | 6/1977 | Langen ........................ 426/281 |
| 4,036,122 | A | * | 7/1977 | Langen ........................ 99/533 |
| 4,520,718 | A | * | 6/1985 | Prosenbauer ................. 99/535 |
| 4,522,118 | A | * | 6/1985 | Simonsen et al. ............ 99/472 |
| 5,307,737 | A | * | 5/1994 | Higashimoto ................ 99/533 |
| 5,323,694 | A | * | 6/1994 | Higashimoto ................ 99/535 |
| 5,405,630 | A | * | 4/1995 | Ludwig ........................ 426/231 |
| 5,564,332 | A | * | 10/1996 | Ludwig ........................ 99/472 |
| 5,972,398 | A | * | 10/1999 | Ludwig et al. .............. 426/281 |
| 6,662,712 | B1 | * | 12/2003 | Ludwig ........................ 99/535 |
| 6,730,341 | B1 | * | 5/2004 | Ludwig ........................ 426/233 |

* cited by examiner

Primary Examiner—Timothy F. Simone
(74) Attorney, Agent, or Firm—Black Lowe & Graham PLLC

(57) ABSTRACT

It comprises an injection station (10); a maceration station (20), including a massaging rotating drum (22) and several drawn quiescent tanks (24); and a packaging station (30). Such stations are linked by an accumulation and loading unit (40) to the drum (22) located between the said injection station (10) and the maceration station (20); a reloading unit (50) located between the station (20) and the unit (40); and a transferring unit (60) to a feeding hopper (62) of the said packaging station (30) including an automatic cleaning unit (70) for the tanks (24). A control center coordinates the operations steps of the stations and units for keeping a non-stop operation, providing a time for cleaning each station, unit or part thereof during such cycle.

25 Claims, 9 Drawing Sheets

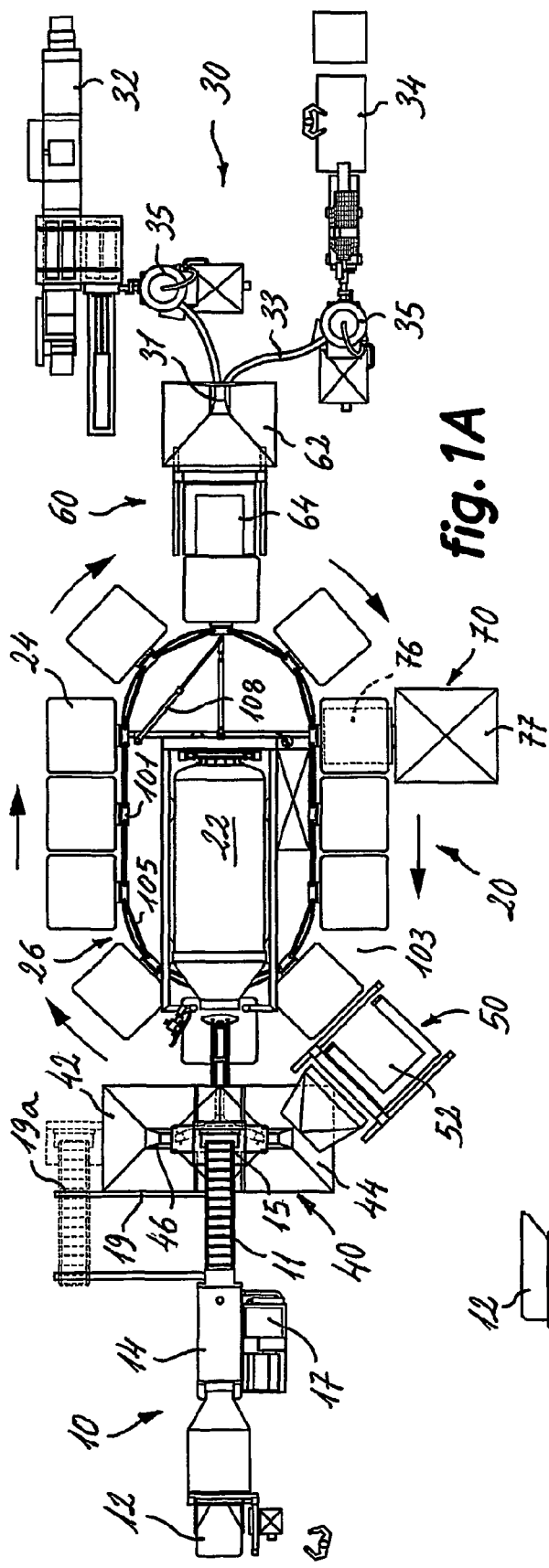
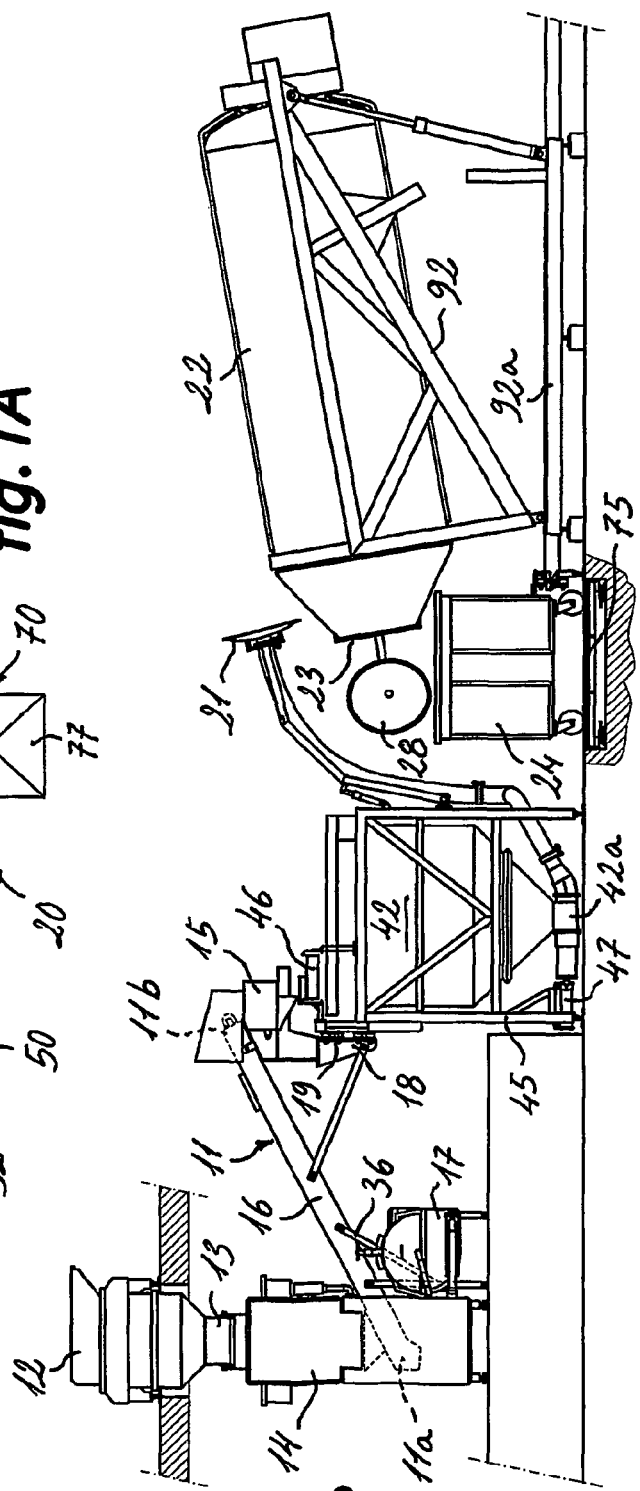
fig. 1A
Fig. 2

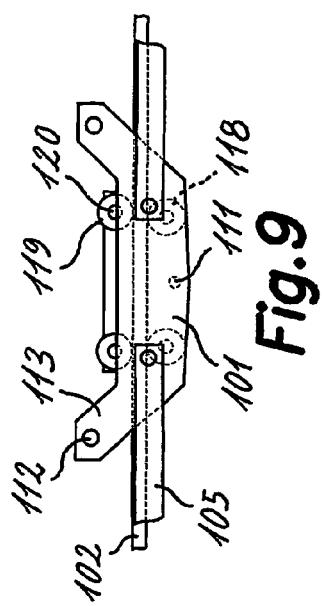
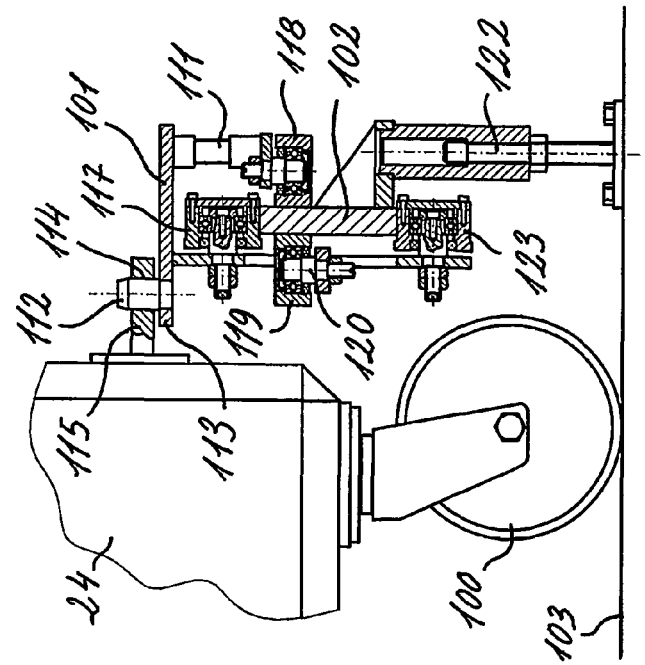
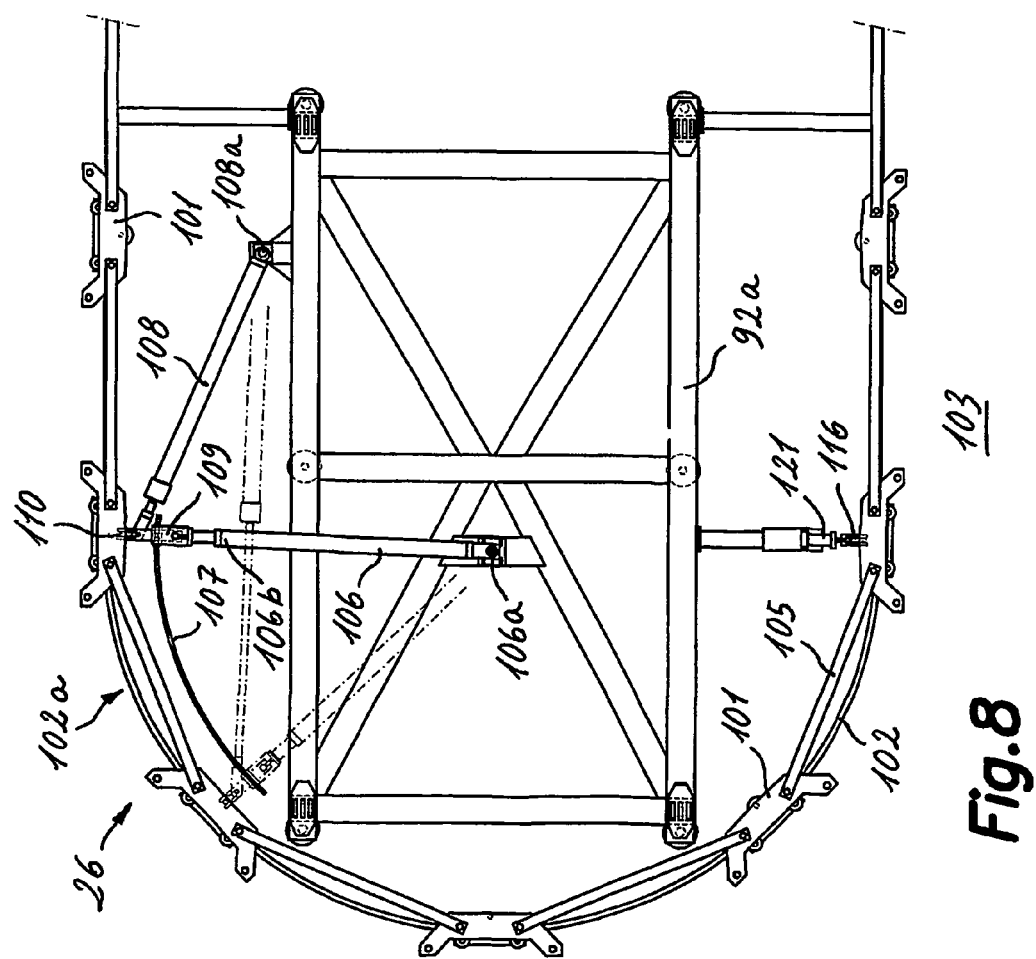

PLANT FOR THE CONTINUOUS PROCESSING AND PACKING OF MEAT PRODUCTS

FIELD OF THE INVENTION

This invention refers in general to a plant for treating and packaging meat product in a non-stop operation and more particularly to a plant capable to receiving and conditions lots of meat products, carrying out a treatment comprising one or more massaging and macerating cycles, alternatively, to each of such lots of meat products and last delivering such treated lots to a packaging station. The plant is controlled by a computer control centre for coordinating the operating steps of different stations and units so that at any moment of the plant working cycle at least one of the stations is operating, providing a time for cleaning each station, unit or part thereof during the said cycle, keeping the plant non-stop operation.

TECHNICAL BACKGROUND

The application for an international patent PCT/ES 00/00061 of this applicant discloses a plant and a process for a non-stop treatment and packaging of the meat product which sets the main lines of such kind of plant depending on stages or steps of a specific process to be implemented in a plant having a non-stop operation.

The process of the said application for a patent PCT/ES 00/00061 essentially comprises the operations of injecting brine to meat products; macerating such injected meat product submitting it to one or more massaging actions alternating with as many quiescent periods; and packaging the treated meat products and characterized in that such operations are carried out in a plant controlled by a centralized control in a chained and automated way, alternatively on different lots of meat products so that at any moment at least two of such lots of meat products are being simultaneously submitted to one of such operations, times for cleaning the different units and stations of the plant having being provided while other units or stations are operating keeping the plant non-stop operation.

To implement such method, the plant of the application for a patent PCT/ES 00/00061 comprises a station for brine injection to the meat products to be treated, a maceration station for the injected meat products including at least a rotating drum for massaging the injected meat product and a plurality of tanks for the massaged meat products settling connected to drawing means to make them move forwards step by step along a closed path around such rotating drum; and a packaging station for the treated meat product. Such stations are coupled to each other for a non-stop operation, linked by a unit for accumulating and loading the injected meat product in the rotating drum, located between the outlet of such injection station and the inlet of the said maceration station, the said accumulating and loading unit comprises at least a first and a second hoppers; a distributing device for distributing the meat product coming from the injection station alternatively to the said first and second hoppers; a reloading unit located between the said maceration station and the said accumulating and loading unit comprising means for newly transferring the massaged-settled meat product coming from the said quiescent tanks to the said second hopper to be reloaded in the said rotating drum; and a unit for transferring the treated meat product to a feeding hopper (62) of the said packaging station. The plant in addition includes a unit for cleaning the quiescent tanks located at a point of the path after the said unit for transferring the meat product to the packaging station. The plant is controlled by the said computer control centre, which coordinates the steps of such stations and units operation so that at any moment of a plant working cycle at least one of such stations is operating, a time being provided for cleaning each station, unit or part thereof during the said cycle, keeping the plant non-stop operation.

In the said plant, the injected meat product is accumulated by lots alternatively in such first and second hoppers of the accumulating and loading unit. The accumulated lot in one of the hoppers is loaded in the rotating drum and submitted to a massaging operation in it while the other hopper is being loaded with another lot of meat products. The lot massaged within the drum is transferred thereafter to one or several of such quiescent tanks which rotate around the drum. The drum, once it has been emptied can be loaded with a new lot of meat product coming from one of the hoppers while the massaged lot sustains a period at rest in related tanks. Preferably, the plant includes a reloading unit with means for transferring a lot of settled meat product from its related quiescent tanks to the said first and second hoppers, and from it newly in the rotating drum for sustaining a new massaging and settling cycle, and so on. The macerated meat product, at the end of the programmed massaging and settling cycled, is transferred by means of the said transfer unit to the hopper feeding the packaging station while new lots are sustaining prior operations. Thus, the plant has a non-stop operation and it is taken profit of the times when some of the stations, units or parts thereof are idle to hand or automatically wash them.

SHORT EXPLANATION OF THE INVENTION

The object of this invention is to provide a plant for non-stop treating and packaging meat product of the above disclosed kind which incorporates several additional elements and concrete technical embodiments which go beyond those disclosed in the state of the art.

Thus, the plant of this invention basically comprises the injecting, macerating and packaging stations coupled to each other by means of accumulating and loading, transferring and feeding and reloading units, plus the additional automatic cleaning unit for the quiescent tanks. The composition of the stations and units as well as their operating process are analogous to those disclosed in the said application for a patent PCT/ES 00/00061.

However, at the plant inlet of this invention, there is arranged an inlet hopper for accumulating lots of meat product to be treated. Such hopper includes first weight detecting means for weighing such lots of meat product and means for transferring such already weighed lots to the injecting machine located in the said injection station. The said computer control centre determines the amount of brine to be injected to each lot depending on the product it is sought to be obtained. Then, each of the said first and second hoppers of the accumulating and loading unit have associated second weight detecting means and the control centre controls a distributing device for distributing the injected meat product coming from the injecting machine between the first and the second hoppers depending on a weight sought for each lot of meat products to be subsequently loaded in the said rotating drum, with the possibility to add brine to a given lot to complete the proportion of brine designed to it.

For transferring the meat product from the outlet of the said injecting machine to a distributing device of the accumulating and loading unit a conveyor belt is provided which has associated a tenderizing machine to superficially cut, if it is required, the recently injected meat product before it is accumulated alternatively in the first and second hoppers and then loaded in the massaging drum. Such conveyor belt and the said tenderizing machine associated to it are mounted on a moving supporting structure, movable between a working and a cleaning position. The relative sizes and positions between the different stations, units or parts thereof can vary depending on the space available for the plant and the productivity sought for the plant. The variations between the said relative positions can have an influence on the mechanical embodiments chosen. Some examples of embodiments are described below referred to the drawing appended.

At the outlet of the first and second hoppers of the accumulating and loading unit are located respective flow valves, driven by fluid dynamic cylinders and selectively controlled to allow loading the content of either the first or second hopper of the rotating drum.

The rotating drum has a loading/unloading mouth at one of its ends facing the first and second hopper of the accumulating and loading station and they are mounted on a tilting structure which allows the drum rotation with different slopes of its longitudinal axis with respect of the horizontal. Such loading/unloading mouth has available two alternative tops, having an automatic drive, different characteristics for carrying out different functions depending on the steps of the working cycle in which they are located.

A first top or loading top is connected to a hose directing the meat product coming from the said transfer means to the accumulating and loading unit and mounted on a first moving arm driven by means of a fluid dynamic cylinder to switch over the position of the said loading top between an idle position, withdrawn from the said loading/unloading mouth and a working position coupled to the loading/unloading mouth. The said hose is connected to a single outlet mouth of a collector to which are arriving respective hoses which respectively starts from the said flow valves of the first and second hoppers of the accumulating and loading stations. This first top is only located at its working position by driving the said first moving arm when the drum is stopped and with a predetermined slope of its spin axis. With the first top at its working position, drum loading is carried out by the sucking effect due to a depression created within the drum by a vacuum pump through a fixed duct located at a blind axial end of the drum, opposed to the loading/unloading mouth. The first top in addition comprises a water inlet and a detergent inlet to which are coupled respective hoses for conducting cold and/or water, and detergent to automatically clean the inside of the drum in the times provided for it.

A second top or massaging top is mounted on a special support fixed on the free end of a second moving arm hinged with respect to the tilting structure of the drum and driven by a fluid dynamic cylinder to switch over the said second top between a idle position, withdrawn from the said loading/unloading mouth, and a working position coupled to the loading/unloading mouth. The said support of the massaging top includes means to allow the massaging top rotates around an shaft integral with it and to absorb small circular translations of the said shaft when rotating with the drum, due to possible misalignments between the shaft of the top and the actual spin axis of the drum. Due to such special shape of the support, this second top can be coupled to the loading/unloading mouth when the drum is stopped and it can remain coupled when the drum is rotating during a massaging sub-cycle and can rotate with it.

The drum is emptied by lifting its blind end, opposed to the loading/unloading mouth by tilting the said tilting support so that through the said open loading/unloading mouth and located at the lowest level, the content of the drum is unloaded in one or more quiescent tanks under a weight control of the content of each tank. Unloading is complete by rotating the drum, which facilitates a quick unloading preventing that the air penetrates within the meat product, and the tank weighing control is carried out with a weight sensor concealed in the floor of the area where the quiescent tanks are stopped under the drum unloading/loading mouth. Typically, the capacity of the quiescent tanks is a fixed conventional capacity and the capacity of the drum is a multiple of that of the quiescent tanks. The number of quiescent tanks alternating their positions around the drum therefore depends on the capacity of the drum and of the number of massaging/settling cycles to which it is sought to submit the meat products.

The quiescent tanks comprise an upperly open deposit and are provided with wheels at their lower part by means of which they can move on a track arranged around the said rotating drum. Each quiescent tank is provided in addition with fastening means for releasably be fastened on a related drawing truck guided along a rail fixed on the floor, such rail defining a closed cycle path along such track around the rotating drum. On their hand, all such drawing trucks are linked to each other by means of hinged bars forming an endless flexible transmitting element along the said rail. Such flexible transmitting element is controlled so that it goes forwards or comes backwards, according to the programme of control adopted, step by step drawing all the quiescent tanks at same time, alternating periods of moving and periods of being stopped. During a period of being stopped, each quiescent tank occupies a stopped position. At each moving period, each quiescent tank moves forwards or backwards from its former stopped position until it exactly occupies the stopped position the former quiescent tanks occupied before and it stops at the said position during a new stop period and so on. Therefore, all the tanks are taking turns at each stop position and the different stations and units of the plant which are interacting with the quiescent tanks do it in some of such stop positions.

To carry out the forwards and backwards motion by steps of all the quiescent tanks, the device comprises driving, coupling and guiding means for successively coupling each of such drawing trucks when it is located in a predetermined stop position, moving it, drawing the rest of the drawing trucks together with all the quiescent tanks coupled to them one step until the following drawing truck occupies such predetermined stop position and then disconnect such drawing truck and newly coming backwards until remaining arranged to newly go one step forward at the position of predetermined stop. Such driving, coupling and guiding means comprise several fluid dynamic cylinders and will be described in details with relation to the drawing appended.

In another point of the path a locking element is arrange fixed at the end of the other fluid dynamic cylinder rod which is in a fixed position and is driven for coupling such locking element to the said anchoring element of a drawing truck stopped in front of it, in order to lock the assembly of quiescent tanks during the periods in which they are stopped.

As it has been said, fastening each quiescent tank to its corresponding drawing truck is releasable and more concretely it is releasable by lifting the truck with respect to the drawing truck. For this, each drawing truck comprises an outwardly protruding platform with which a pair of upright stubs are integral which are socketed in related holes located in a fixed plate horizontally protruding from a side of each quiescent tank at a suitable height. At the stations or units of the plant which requires to temporarily withdraw each quiescent tank from the said path, means are provided for lifting one of such quiescent tanks sufficiently to disconnect such holes from such stubs and withdraw the quiescent tanks from the path at the related stop position and then bring the tank back to such stopped position and lower the tank for newly coupling the stubs of the drawing truck in the holes of the tank. Obviously, the system would operate with identical effectiveness if the stubs would be downwards fixed in the tank and the holes pierced in the drawing truck.

Concretely, to be emptied, the quiescent tanks require to be withdrawn from the circuit, lifted up to a convenient height and tippled for unloading their content and this is carried out in the said transferring and feeding and reloading units.

In these units, lifting-tippling apparatuses are arranged, each comprising a structure, having a suitable height, open by one of its side faces leaning on the path, such structure incorporating an unloading ramp at the top end of another of its side faces. At the foot of the structure there are means for lifting one of the said tanks, when it is located in a stop position on the path, sufficiently for disconnecting the upright stubs integral with their related drawing truck, and transferring the said unhooked tank from the stop position to the inside of the structure bottom, within which structure means are arranged for fastening and uprightly lifting the quiescent tank within such structure and tippling it on the said unloading ramp at the top end of one face of the structure.

The said means for lifting, disconnecting and transferring such quiescent tanks from the stop position in the path to the inside of the structure bottom comprise rails horizontally extending inside the structure bottom through the said open side face, and the said stop position, so such rails cross the said track through which are moving the tanks when they are pulled by their drawing trucks. The rails have interruptions to provide passing areas for the said wheels of the quiescent tanks. On such rails a displacing tank is moving driven by a fluid dynamic cylinder between such stop position of the quiescent tanks on the path and inside the structure. To fill the gap of the said interruptions of the rails, such displacing truck is provided with at least three wheels on each side arranged for rolling on each of the rails so that when one of the said wheels is located at one of the said interruptions, at least two other wheels are supported on the rail. On such displacing truck is mounted an uprightly moving platform which is connected to the ends of the rods of fluid dynamic cylinders uprightly fastened on the displacing truck.

When the displacing truck is operating with the moving platform lowered, it is located under a filled tank located at the related stop position of the path. Then the fluid dynamic cylinders are driven for lifting the said moving platform, which in turn lifts the quiescent tank located on it up to such sufficiently high to release from the holes of the tank the stubs of the drawing truck and then the displacing truck moves toward the structure withdrawing the tank from the circuit. Obviously, such means are also capable of the opposite operation, that is to say, to move a quiescent tank when it has ben emptied, in a slightly lifted position, from the said fastening means from the inside of the structure base up to the path and lowering the quiescent tank for hooking it to the related drawing truck.

When the displacing truck horizontally introduces the filled quiescent tank, recently disconnected from its path, in the structure bottom, frames provided at the top part of the quiescent tank are introduced in guides horizontally arranged on sides of a top part of the said tippler. When the tank completely penetrates in the structure bottom, it stops against a side supporting wall which is extending downwards from the said top part of the tippler. Such tippler is linked to a lifting truck located inside the said structure by means of a substantially horizontal hinge. The said lifting truck is uprightly guided along the said face of the structure which is ended by the said unloading ramp and is moving up and down driven by a chain mechanism and fluid dynamic cylinder. When the lifting truck arrives at the top of the structure, another driving fluid dynamic cylinder causes the tippler, and therefore, the quiescent tank fastened to it, tippling about the said hinge to empty the contents of the tank in related unloading ramp.

In the reloading unit, the position of the second hopper, in which the load of the tanks have to be transferred to the tanks, with respect to the rotating drum requires that the tank tippling is carried out according to an hinge spin substantially perpendicular with respect to the path of the tanks, therefore the said face of the structure ended by the said unloading ramp and along which they are fastened on the driving device of the lifting truck, is a face contiguous to such open face of the structure and parallel to the said rails on which the displacing truck is moving. Such arrangement is also useful for the unit for transferring to the packaging hopper in the cases in which a scarce availability of space requires to place the said packaging hopper very close to the path.

On the contrary, in the cases that the availability of space allows to place a outlet hopper spaced from the path of the tanks, tippling the quiescent tanks in the unit of transferring to the packaging hopper is carried out according to a pin of the said hinge substantially parallel or tangent to the path. For this, the said side face of the structure ended by the said unloading ramp and along which the lifting truck is moving is a face facing said open face of the structure and perpendicular to the said rails.

The said packaging hopper of the unit transferring to the packaging hopper comprises a single outlet connected to a distributing device from which are starting two or more hoses connected to as many other packaging machines, which have sucking means for sucking the treated meat product accumulated in the said hopper according to its rating. Therefore there is no valve at the outlet of the said valve. On the contrary, at the top part of the said outlet hopper, means for detecting the level are provided, such as optic sensors for controlling the level of emptying it. The central control means controls the packaging machines in order that they stop when the outlet hopper is empty.

Last, the said automatic cleaning unit of the empty quiescent tanks comprises an automatic cleaning cabinet arranged adjacent to a stop position on the track of the path in order that the quiescent tanks move. A pivoting arm hinged at the bottom of the said cabinet has a lifting end with a bottom frame and a side supporting wall close to the said bottom frame, which can be concealed at the stop position of the said track. Such pivoting arm is capable of rotating with respect to its hinge, driven by a fluid dynamic cylinder for taking a quiescent tank stopped on the said bottom frame and lifting it, unhooking it from its related drawing truck, performing a circular path until introducing it laying on the said side supporting wall inside the automatic cleaning cabinet, where it is cleaned by automatic means. The, the pivoting arm is newly lowered and the quiescent tank is returned, clean, to the path, being newly hooked to the related drawing truck. Despite the said circular path, taking the stubs of the drawing trucks in and out the holes of the tank is carried out without problems thanks to the great turning radius provided by the great length of the said arm.

SHORT EXPLANATION OF THE DRAWINGS

An example of preferred embodiment is described thereafter according to this invention which is provided only for illustrating and not limiting, the description of which includes references to the drawings attached, in which:

FIG. 1A is a plan view of a plant according to this invention in which all the stations and units are in straight line and in which the maceration station comprises twelve quiescent tanks;

FIG. 2 is a side elevation part view of the plant of FIG. 1B showing the injection station, a part of the maceration station and the accumulating and loading unit linking them;

FIG. 8 is a part plan view showing a portion of the guide which constitutes the path of the quiescent tanks around the rotating drum, including the drawing system of the quiescent tanks;

FIG. 9 is a plan view of an enlarged detail showing a drawing truck of the drawing system of FIG. 8 and its link to such guide;

FIG. 10 is a cross sectional profile view of the drawing truck of FIG. 9 and its link to a quiescent tank;

DETAILED DESCRIPTION OF A PREFERRED EXAMPLE OF EMBODIMENT

Figure 1B:
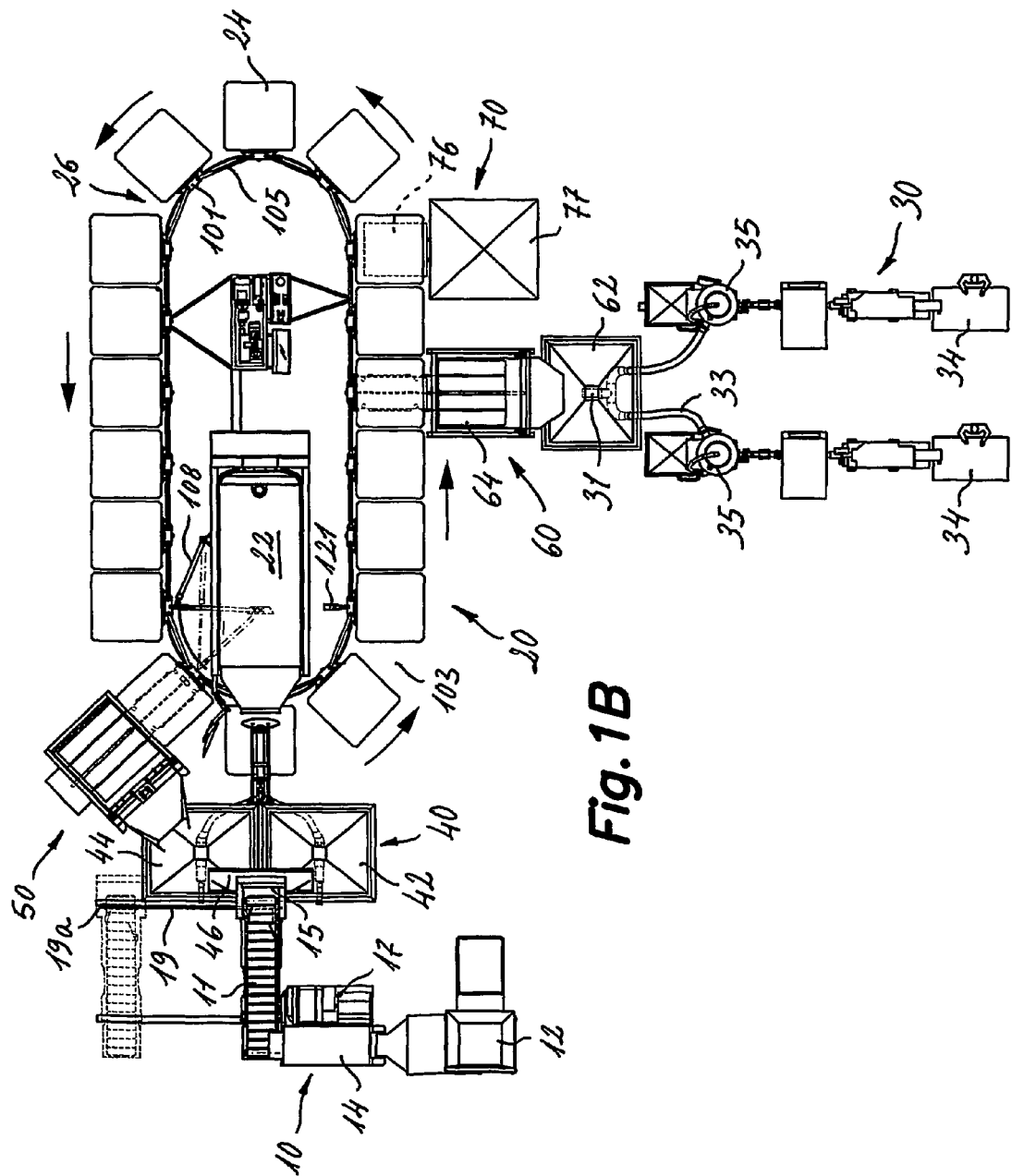
FIG. 1B is a plan view of another plant according to this invention in which all its stations and units are forming an angle for best fitting the space available and where the maceration station comprises eighteen quiescent tanks.

Referring first to FIGS. 1A and 1B, they show a plan view of the plants for treating and packaging meat product in a non-stop operation according to this invention. Both plants essentially comprise a brine injection station 10 for the meat product to be treated; a maceration station 20 for the injected meat product; and a packaging station 30 for the treated meat product, such stations 10, 20, 30 being coupled to each other for working in a non-stop operation, linked by an accumulating and loading unit 40, located between the outlet of the said injection station 10 and the inlet of the said maceration station 20; a reloading station 50 located between such maceration station 20 and such accumulation and loading unit 40; and a transferring unit 60 for treated meat product from the maceration station 20 to a hopper 62 for feeding such packaging station 30.

The injection station 10 includes an injection machine 14 for injecting brine to the meat product pieces. The maceration station 20 includes a rotating drum 22, for massaging the injected meat product, and a plurality of quiescent tanks 24 for the massaged meat product connected to drawing means 101, 102 (FIG. 8) to make them move forwards or backwards, step by step along a closed path 26 around such rotating drum 22. The packaging station 30 includes two dosing-stuffing machines 35 connected to respective packaging lines which can include packaging machines 34 of same kind, such as in FIG. 1B or packaging machines 32, 24 of different kinds, such as FIG. 1A, according to the kind of package to be used.

Figure 3:
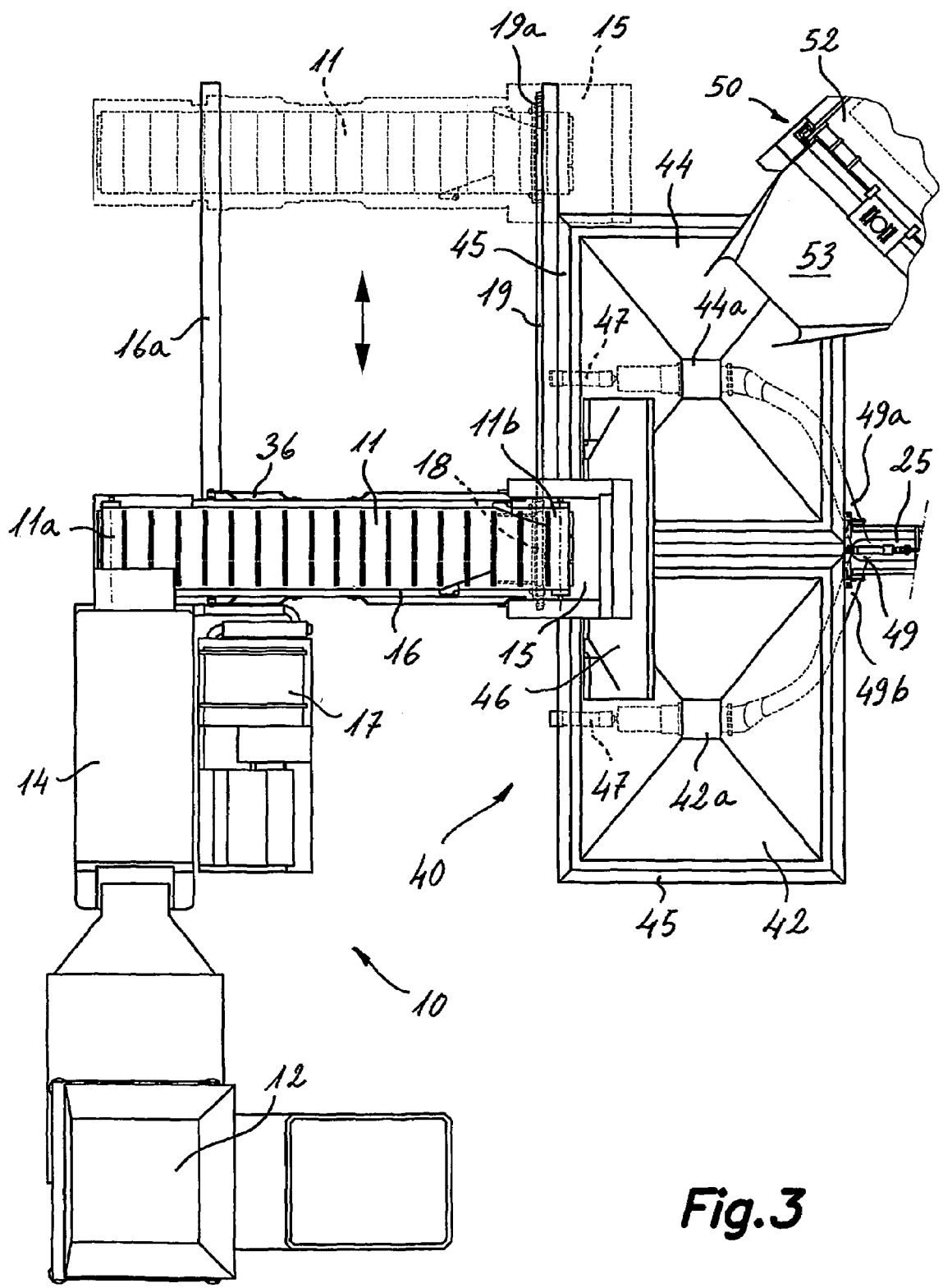
FIG. 3 is an enlarged part plan view of the injection station and the first and second hoppers of the accumulating and loading units, where is shown in solid lines the carrier of meat product pieces coming from the injection machine at its working position and in dash lines, at its cleaning position.

On its hand, the accumulating and loading unit 40 shown with full details in FIG. 3 comprises at least a first and a second hoppers 42, 44, a distributing device 46 for distributing the meat product coming from the injection station 10 alternatively to the said first and second hoppers 42, 44, and means for transferring 42a, 44a, 21, 25 for loading the meat product accumulated in the hoppers 42, 44 to the rotating drum 22. The reloading unit 50 (FIG. 13) comprises means for newly transferring the massaged-settled meat product coming from the said quiescent tanks 24 to such second hopper 44 to be reloaded in such rotating drum 22 and to proceed to new massages if the process requires it so. Last, the transferring unit 60 (FIG. 11) comprises means for transferring the massage-settled meat product coming from the said quiescent tanks 24 to an outlet hopper 62 which feeds the packaging station 30.

The plants of FIGS. 1A and 1B in addition include a unit 70 for cleaning the quiescent tanks 24 at a point of the path 26 after the transferring unit 60 to the feeding hopper 62. The plant has available at least a computer control centre (not shown) for coordinating the operating steps of the said stations and units so that at any moment of a working cycle of the plant at least one of the stations is operating, a time being provided for cleaning each station, unit or part thereof during such cycle, keeping the non-stop operation of the plant.

In the plant of FIG. 1A, it can be seen that stations 10, 20, 30 and units 40, 50, 60 are arranged in line so that the meat product pieces to be treated come in by one end, concretely by the injection station 10 and come out as a treated and packaged meat product by the other end, that is to say, by the packaging station 30, carrying out the whole of the non-stop operation according to the process disclosed by the said application for an international patent PCT/ES 00/00061. The plant of FIG. 1B shows its stations 10, 20, 30 and units 40, 50, 60 forming an angle for a best fitting to an available limited space, which is not an hindrance for the non-stop operation of the plant in a way fully analogous to that of the FIG. 1A. Obviously, other variations are possible as for the arrangement of the elements without affecting the plant operation.

It will be also noted that the plant of the example of embodiment of FIG. 1B has a higher rating than the plant of the example of embodiment of FIG. 1A. This difference is specially evidenced by the fact that the maceration station 20 of the plant of FIG. 1B comprises a higher number of quiescent tanks 24, eighteen in total, than the maceration station of FIG. 1A, where there are only twelve. The rating of the plant is ratably to the number of quiescent tanks and their rating, as well as the rating of the remaining elements of the line. The sense in which such quiescent tanks 24 move around the rotating drum 22 is also different, indicated by means of arrows in FIGS. 1A and 1B. This affects, for example, the positions of the reloading units 50 with respect to the accumulating and loading units 40 or the cleaning units 70 with respect to the transferring and feeding units 60, which are in opposite sides in both plants. It has to be borne in mind, anyways, that the move of the quiescent tanks 24 can be backwards for reaching the point wished, if the distance is shorter. On the other hand, the plants of FIGS. 1A and 1B are essentially the same and following detailed description of their elements will be basically with reference to FIG. 1B and following the same travel as that of the meat product pieces through the plant.

First, and as it is also shown in FIGS. 2 and 3, the injection plant 10 comprises an inlet hopper 12 for accumulating lots of meat product to be treated. Such inlet hopper 12 is provided with first means for detecting the weight of the meat product of such lots and means, such as an automatic gate 13 for feeding the meat product of such lots, after they have being weighed, to an injection machine 14 of the said injection station 10, which is associated to a related brine filter 17 for recovering the excess of injection. The said computer control centre includes means for determining the amount of brine to be injected to each lot depending on its weight detected.

FIG. 2 shows the inlet hopper 12 installed at a top floor and with the gate 13 directly arranged on the inlet of the injection machine 14. However, the hopper 12 could be at same floor as the rest of the plant and the means for loading the meat product to the injection machine 14 could be a conveyor, lifting mechanism or the like.

A conveyor belt 11 serves for transferring the meat product from the outlet of the said injection machine 14 to the said distributing device 46 of the accumulating and loading unit 40. A tenderizing machine 15 is associated to the said conveyor belt 11, which allows to superficially cut, if it is required, the injected meat product before they are accumulated in the first and second hoppers 42, 44 and then loaded in the rotating drum (22). The conveyor belt 11 together with the said tenderizing machine 15, is mounted on a moving truck 16, which can be moved between a working and a cleaning position. Such moving truck 16 bearing the conveyor belt 11 comprises, at one lower end, feet 36 provided with wheels and, at the other top end, a sliding support 18 which can be moved retained on and guided by at least one guide 19 horizontally fixed on a supporting structure 45 of such first an second hoppers 42, 44. Such feet 36 provided with wheels and the sliding support 18 facilitate the said cross displacement of the conveyor belt 11 along the guide 19, which has a first end corresponding to the working position and a second end 19a, corresponding to the cleaning position. Such second end 19a of the guide sidewards protrudes beyond the said supporting structure 45. In FIG. 3, a track is indicated with the numeral 16a through which are rolling such wheels (not shown) of the lower end of the moving truck 16 of the conveyor belt 11.

The tenderizing machine 15 is fastened on the moving truck 16 so that a second end 11b of the conveyor belt 11, at a higher level thereof is located on the inlet of the said tenderizing machine 15. When the conveyor belt 11 is located at such working position, a first end 11a thereof remains located under the inlet of the injection machine 14 while the outlet of the tenderizing machine 15 remains located on the distributing device 46. On the contrary, when the conveyor belt 11 is at the said cleaning position, shown in dash lines in FIGS. 1A, 1B and 3, as well the conveyor belt 11 itself as the injection machine 14 are far away from other components and structures and are completely accessible to proceed to clean them. The displacements between such working and cleaning positions are carried out by means of hand drawing the moving truck 16 along the guide 19 and track 16a, although it would also be possible to have mechanized actuating means available, for example, in the form of a pinion and rack device driven by an electric motor.

Each of the said first and second hoppers 42, 44 of the accumulating and loading unit 40 has associated second weight detecting means which release a signal to the said computer control centre referring to the amount of meat product accumulated in each hopper 42, 44. The control centre controls the distributing device 46 for distributing the meat product between the first and second hoppers 42, 44 depending on a weight sought for each lot of injected meat product to be subsequently loaded in the said rotating drum 22. Thus, the amount of meat product constituting each lot corresponds to the load rating of the rotating drum 24, such load being in turn a multiple of the rating of each of the quiescent tanks 24. In the examples of FIGS. 1A and 1B, the rating of each of the hoppers 42, 44 is equivalent to a full load of the rotating drum 22, which in turn corresponds to the load of the two quiescent tanks 24 in the case of FIG. 1A or three quiescent tanks 24, in the case of FIG. 1B. This is the reason why the quiescent tanks 24 are located, in the examples of FIGS. 1A and 1B, respectively, in a number which is multiple of two and three around the drum 22 (twelve and eighteen, respectively). At the outlet of the first and the second hoppers 42, 44 of the accumulating and loading unit 40, respective flow valves 42a, 44a are arranged, driven by respective fluid dynamic cylinders 47, from which flow valves 42a, 44a start respective hoses 49a, 49b which joins a collector which offers a single common outlet mouth 49 (FIG. 5).

Figure 4:
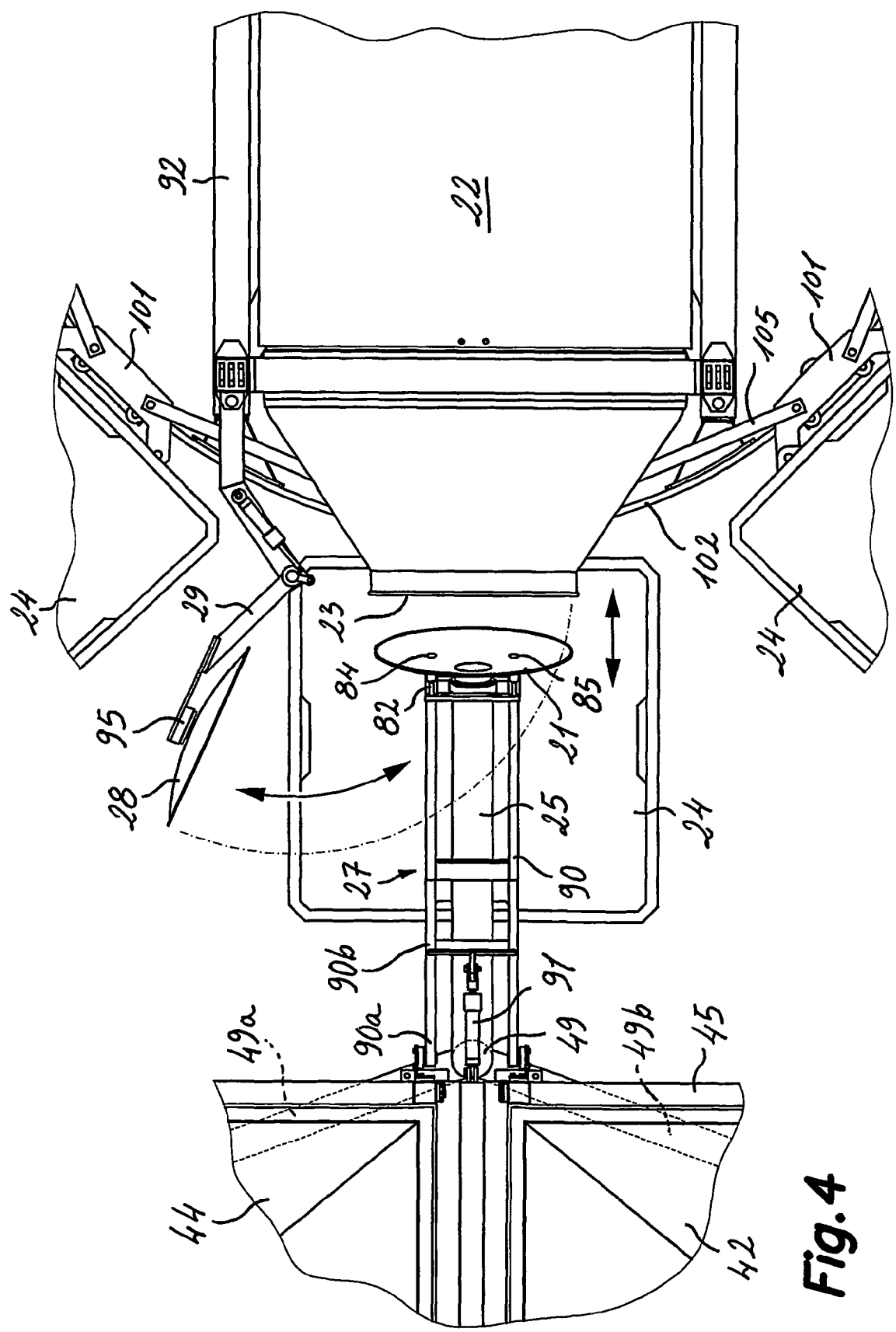
FIG. 4 is a part plan view showing the set of first and second tops of the loading/unloading mouth of the rotating drum, that is to say, the loading top and the massaging top.

Referring now specially to FIG. 4, the rotating drum 22 has the loading/unloading mouth 23 at one of its axial ends facing the first and second hoppers 42, 44 of the accumulating and loading station 40, and are mounted on a tilting structure 92 which allows drum 22 rotation with different slopes of its longitudinal shaft with respect to the horizontal. Such loading/unloading mouth 23 has available two alternative tops 21, 28, both having different characteristics and automatically driven for performing different functions depending on the steps of the working cycle in which they are located. Such two tops comprise a first top or loading top 21 and a second top or massaging top 28.

Figure 5:
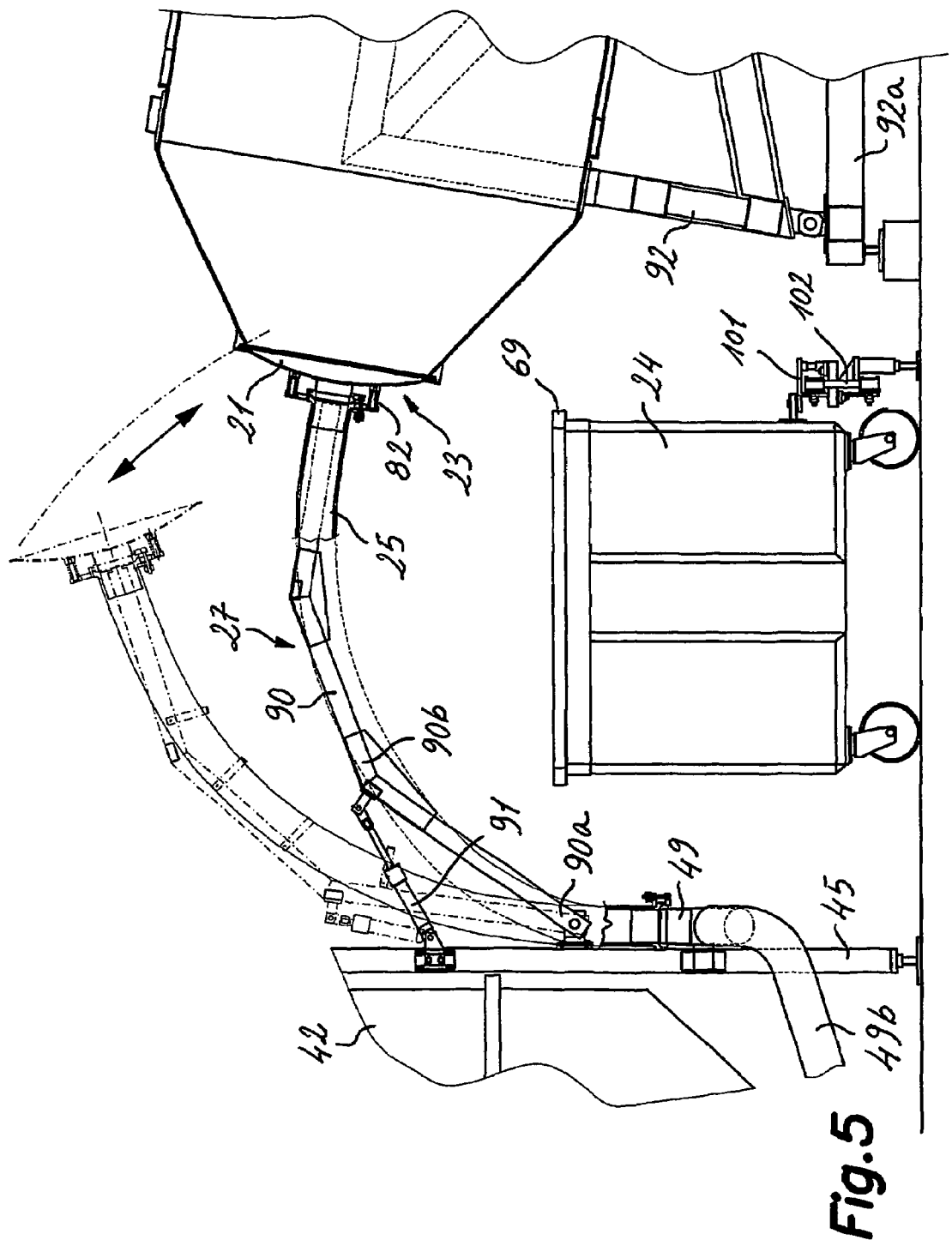
FIG. 5 is a sectional part side elevation view, showing the set of the first top or loading top.

The said loading top 21, best shown in FIG. 5, is connected to a hose 25 for conducting the meat product connected to the said common single outlet mouth of the accumulating and loading unit 40 and mounted on a first moving arm 27 driven for switching over the said loading top 21 between an idle position, withdrawn from the said loading/unloading mouth 23 and shown with dash lines in FIG. 5 and such working position coupled to the loading/unloading mouth 23. The loading top 21 is placed in a working position only when the drum 22 is stopped and slightly inclined backwards to proceed to loading it by sucking it because of a depression created within the drum 22 by an external vacuum pump (not shown) through a duct located at one end of the drum 22 opposite to the loading/unloading mouth 23. At the computer control centre means are provided for selectively controlling such flow valves 42*a*, 44*a* (FIG. 3) and the drive of such first moving arm 27 and vacuum pump for loading the contents of either the first or the second hopper 42, 44 in the rotating drum 22.

The first top 21 includes a water inlet 84 and a detergent inlet 85 (FIG. 4) connected to respective hoses (not shown in the figures) for conducting cold and/or hot water and detergent, supported on the said first moving arm 27, through which an automatic cleaning is carried out within the drum 22 during such periods of the production cycle in which the drum is not operating.

The moving arm 27 of the first top 21 comprises (FIG. 5) a stiff bars structure 90 which has an arcuate shape along which an internal space is delimited, protected, through which is passing and supported the said hose 25, such stiff bars structure 90 being hinged by a first end 90*a*, distal from the said first loading top 21, to a supporting structure 45 of such first and second hoppers 42, 44 and linked by a middle area 90*b* to the rod of a fluid dynamic cylinder 91 the head of which is fixed on the said supporting structure 45, the fluid dynamic cylinder 91 of which drives the said first arm 27 to carry out such switch over between the said working and idle positions of the first loading top 21. Fastening the loading top 21 on the arm 27 is carried out through a support 82 provided with elastic means for providing a smooth coupling.

Figures 6, 7:
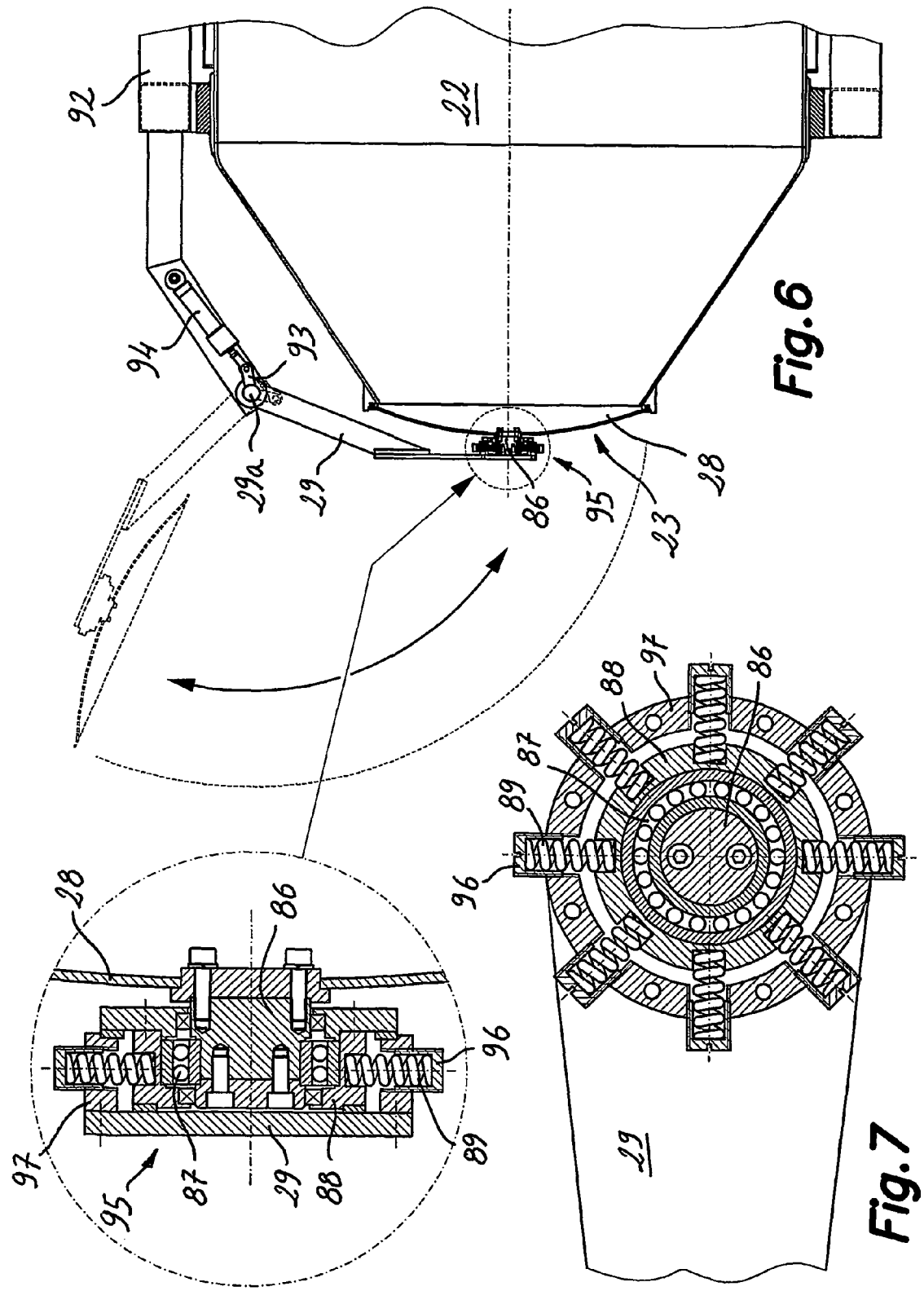
FIG. 6 is a sectional part plan view showing the set of the second top or massaging top with an enlarged detail of the fastening and guiding device of the said top shaft.
FIG. 7 is a front view of the enlarged detail of the fastening device of FIG. 6.

On its hand, such second top or massaging top 28, best shown in FIG. 6 is mounted on a support 95 fixed on the free end of a second moving arm 29 driven for switching over the said second top 28 between an idle position, withdrawn from the said loading and/or unloading mouth 23 and shown with dash lines in FIG. 6, and a working position coupled to the loading/unloading mouth 23. Coupling the massaging top 28 to the loading/unloading mouth 23 is usually carried out when the drum 22 is stopped. However, the top 28 is still coupled to the drum 22 when the later is rotating during a massaging subcycle. For this, the top 28 comprises a shaft 86 integral with it fastened and guided by the support 95 so that it allows its free rotation. The support 95 in addition includes means for absorbing small circular translations sustained by the said shaft 86 when it is rotating jointly with the drum 22. These small translations are due to possible misalignments between the centre of the loading/unloading mouth 23, with respect to which the shaft 86 of the top 28 is centred and the actual rotation of the drum 22.

This shaft 86, as it is best shown in enlarged details in FIG. 6 is integral with the massaging top 28 by screws, externally protruding from the central area of the top 28 and when the massaging top 28 is in such working position, it remains substantially aligned with the drum 22 spin axis. The shaft 86 is supported and guided on the support 95 by at least a bearing 87 housed in a bearing-holder 88, which is mounted on elastic suspension means 89 incorporated in a part 97 of the said support 95 fixed on the second moving arm 29. Thus, when the massaging top 28 rotates jointly with the drum 22, such shaft 86 can rotate and carry out the said small circular translations with respect to such second arm 29 against the strength of the said elastic means 89.

In the example of embodiment shown, such elastic means comprise a plurality of helical springs 89 radially arranged as a star as it can be best seen in FIG. 7 in housings of such part 97 of the support 95 fixed at the free end of the second arm 29. The external ends of the helical springs 89 are supported on bottoms having adjustable depth 96 which take the form of hollow stoppers for such housings and their external ends supported against cavities provided in such bearing-holder 88. Each of such stoppers 96 is threaded in the internal wall of its corresponding housing so that, when rotating each stopper 96, the depth of related bottom is varied and with it the compression and the strength exerted by each spring 89.

For driving it, such second moving arm 29 comprises, at its end distal from the massaging top 28, a hinge 29*a* with respect to the tiltable supporting structure 92 of the rotating drum 22. A fluid dynamic cylinder 94 has its rod linked to a crank handle 93 integral with the shaft of the said hinge 29*a* and a head linked to such tiltable structure 92, the fluid dynamic cylinder 94 of which drives such second arm 29 to switch over between such working and idle positions of the second massaging top 21. Detection means (not shown) are communicated with the computer control centre to indicate the working or idle position of this second or massaging top 28.

On the whole of the perimeter of the loading/unloading mouth 23, an elastic joint is arranged which assures the tight closure as well of the first top 21 as that of the second top 28, which when they are at their respective working positions are kept pressed against such elastic joint because of the said depression created within the drum 22.

Unloading the meat product pieces of the drum 22, after completing a massaging subcycle to the quiescent tanks 24 is carried out opening first the massaging top 28, tilting the drum 22 by tilting its supporting structure 92 (FIG. 2) and driving the drum rotation, which facilitates a quick unloading preventing that air penetrates in the meat product. By means of a weight sensing device 75, concealed in the floor of the stop area of the quiescent tanks located under the loading/unloading mouth 23 of the drum 24, a control of weight of the meat product poured to each tank is carried out.

The system for drawing the quiescent tanks 24 is described below with reference to FIG. 8 to 10. Around the rotating drum 22 is arranged a track 103, for example in the form of a rendered cement pavement on which such quiescent tanks 24 can move which are provided for this with related wheels 100 having free rotation and orientation. Each quiescent tank 24 is in addition provided with fastening means for being releasably fixed on a related drawing truck 101 guided along a lane 102 fixed at a given distance from the floor (adjustable) by means of feet 122. Such lane 102 defines the said path 26, in closed circuit, of the quiescent tanks 24 around the drum 22 along such track 103. All the said drawing trucks 101 are linked to each other by means of hinged bars 105 forming as a whole an endless flexible transmission element along such lane 102. Driving, coupling and guiding means 106, 107, 108, 109, explained with more details below are arranged for successively coupling each of the said drawing trucks 101 when they are located at a given position and move it, drawing the rest of the drawing trucks 101 together with all the quiescent tanks 24, one step until the following drawing truck 101 occupies the said predetermined position for thereafter disconnecting the said drawing truck 101 and newly come back to the predetermined position and so on to make all the quiescent tanks 24 move forwards and backwards step by step. The computer control centre controls such driving and coupling means 106, 108, 109 depending on the preestablished program and the data received from the different sensors the plant incorporates.

The said lane 102, in the example of embodiment best shown in FIG. 8 to 10, comprises a handrail having flat faces fixed on the floor, with the higher size of its cross section in upright position and the drawing truck 101 comprises supporting wheels 117 which rolls on the top face of the said handrail 102 and guiding wheels 118, 119, facing each other by pairs, with one wheel for each pair rolling on opposite sides of the handrail 102, one of the wheels 119 of each pair being mounted on an eccentric shaft 120 to facilitate its mounting adjustment. Another pair of guiding wheels 123 are supported on the lower edge of the handrail 102 for preventing that the truck 101 is lifted.

The driving, coupling and guiding means 106, 107, 108, 109 act on a length of the said path 26 on which the lane 102 defines a circumference arc 102a, angularly movable, starting on the said predetermined position and comprise (FIG. 8) an arm 106, angularly moving, hinged by one end with respect to an upright shaft 106a located at the centre of the said circumference arc 102a and guided by the opposite end 106b with respect to a curved guide 107 parallel to the circumference arc 102a. A first fluid dynamic cylinder 108, having a long run, is mounted with its hinged head at a fixed point 108a with respect to the floor and the end of its rod linked to the said opposite end 106b of the arm 106. A second fluid dynamic cylinder 109, having a short run, is fixed on the said opposite end 106b of the arm 106 and a coupling element 110, fixed at the end of its rod, can be connected/disconnected in a complementary anchoring element 111 (FIG. 10) integral with each drawing truck 101, because of the extension/retraction of the said rod of such fluid dynamic cylinder 109. By matching the motions caused by the said first and second fluid dynamic cylinders 108, 109, the whole of the drawing trucks are moving one step, forwards or backwards on the said path 26, depending on the program selected or the requirements of each moment. All this set of driving, coupling and guiding means 106, 107, 108, 109 can be duplicated at the other end of the path 26 if the plant rating requires a greater drawing strength.

In another point of the path 26, a locking element 116 is fixed to the end of the rod of another fluid dynamic cylinder 121, having a short run, which is in a fixed position and is driven for coupling the said locking element 116 with the said anchoring element 111 of a drawing truck 101 stopped in front of it in order to lock the set of quiescent tanks 24 during the periods in which they are stopped. Driving this third fluid dynamic cylinder 121 is logically coordinated with driving the first and second fluid dynamic cylinders 108, 109 in order to prevent interferences. In the example of embodiment of FIG. 8, anchoring the fluid dynamic cylinders 108, 109, 121 with respect to the floor is carried out through a fixed bottom 92a of the tiltable structure 92 of the drum 22.

The said fastening means for releasably fixing a quiescent tank 24 on a corresponding drawing truck 101 comprise (FIG. 10) a pair of upright stubs 112 integral with platforms 113 protruding outwards each drawing truck 101, such stubs being socketed in holes 114 located in plates 115 horizontally protruding from a side of each quiescent tank 24 at a suitable height. It is obvious that by slightly lifting one of the quiescent tanks 24, it would immediately be unhooked from its related drawing truck 101. Thus, in predetermined stop positions of the path 26 where it is necessary to temporarily withdraw the quiescent tanks 24 from it and then newly placing them, means 55, 56, 59, 61 means (FIGS. 11 and 13) have been provided capable to lift a related quiescent tank 24 sufficiently for releasing such holes 114 from such stubs 112 and withdraw them from the path 26 or by means of a reverse motion, newly hook them on its related drawing truck 101.

Such interaction with the quiescent tanks 24 is carried out in the reloading unit 50 and the transferring unit 60 to the feeding hopper 62, as well as in the cleaning unit 70.

The said automatic cleaning unit 70 for the empty quiescent tanks 24 is of a conventional kind, therefore it has not been illustrated in details and comprises, for withdrawing the quiescent tanks 24 from the path 26 a pivoting arm hinged on the bottom of the said unit which has a lifting end having a suitable frame, concealable at the related stop position of the said track 103. Such pivoting arm is capable of rotating with respect to its hinge, driven by a fluid dynamic cylinder to take a quiescent tank 24 stopped on the said frame of the arm and lift it, unhooking it from its related drawing truck 101, making a circular path until introducing it laying within an automatic cleaning cabinet 77, where it is cleaned by automatic means. Then the pivoting arm 76 is newly lowered and the quiescent tank 24 is returned, already clean, to the path 26, being newly hooked on related drawing truck 101. Despite the said circular path, taking the stubs 112 of the drawing truck 101 in and out related holes 114 of the tank 24 is carried out without any problem thanks to the great radius of gyration provided by the great length of such arm 76.

For handling the quiescent tanks 24, the reloading 50 and transferring and feeding 60 units count with respective lifting-tippling apparatuses 52, 64 which will be described thereafter with reference to FIG. 11 to 13. Although both lifting-tippling apparatuses 52, 64 follows same operation principle, there exists some differences between them because the first (FIG. 13) carries out a side tippling of the quiescent tanks 24 while the second (FIGS. 11 and 12) carries out a front tippling thereof.

Essentially, each of such lifting-tippling apparatuses 52, 64 comprises a structure 51, having a suitable height, open by one of its side faces leaning against the path 26. At the top end of another of its side faces, this structure 51 incorporates an unloading ramp 53. Each lifting-tippling apparatus 52, 64 in addition comprises means 55, 56, 59, 61 for lifting one of the said quiescent tanks 24 sufficiently for releasing from holes 114 located in plates 115 horizontally protruding from a side of the quiescent tank 24, upright stubs 112 integral with platforms 113 associated to related drawing trucks 101 (FIG. 10) of the quiescent tanks 24 along the path 26 and transfer such quiescent tank 24, unhooked, from the path 26 to inside the base of the structure 51 and means for uprightly fastening and lifting the quiescent tank 24 inside such structure and tippling it on the said unloading ramp 53 at the top end of the structure 51.

The said means for lifting, unhooking and transferring such quiescent tanks 24 from the path 26 to inside the structure 51 bottom comprise rails 54 horizontally extending from inside the structure 51 bottom through the said open side face until crossing such track 103 of the path 26. The said rails 54 show interruptions at the passing areas of the wheels 100 of the quiescent tanks 24. A displacing truck 55 driven by a fluid dynamic cylinder 56 having a long run for horizontally moving on the said rails 54 between a first position when the quiescent tanks 24 are stopped on the path 26 and a second position within the structure 51. The displacing truck 55 is provided with at least three wheels 58 at each side arranged for rolling on the rails 54 so that when one of the said wheels 58 is one of the said interruptions of the rails 54, at least two other wheels 58 are supported on such rails 54. Mounted on such displacing truck 55 there is an uprightly moving platform 59 which is connected to the ends of the rods of fluid dynamic cylinders 61 uprightly fixed to the displacing truck 55. By driving such fluid dynamic cylinders 61 the said moving platform 59 is lifted, jointly with a quiescent tank 24 located on it, until the said height sufficient for releasing the stubs 112 from the holes 114. Means 55, 56, 59, 61 are also capable of carrying the opposite operation, that is to say, transfer an emptied quiescent tank 24, in a slightly lifted position, from the fastening means inside the structure bottom 51 to the path 26 and lower the quiescent tank 24 for hooking it to the related drawing truck 101.

On the other hand, the said fastening and uprightly lifting and tippling means of the quiescent tank 24 comprise a lifting truck 63 located inside the said structure 51 and uprightly guiding along rails 68 fixed on the said side face of the structure 51 ended by the said unloading ramp 53, such lifting truck 63 is moved up and down on the said guides 68 driven by a chain mechanism 71 and fluid dynamic cylinder 73. A tippling member 65 for a quiescent tank 24 is linked to a top part of the said lifting truck 63 by means of an hinge 66 substantially horizontal and linked by a point relatively far away the said hinge 66 at the end of a rod of a fluid dynamic cylinder 67 the head of which is linked to a lower part of the lifting truck 63. When the lifting truck 63 is at the top of the structure 51, driving such fluid dynamic cylinder 67 causes the quiescent tank 24 tippling such quiescent tank being fastened by the said tippling device 65 around the hinge 66 for emptying its contents on the unloading ramp 53.

Figure 13:
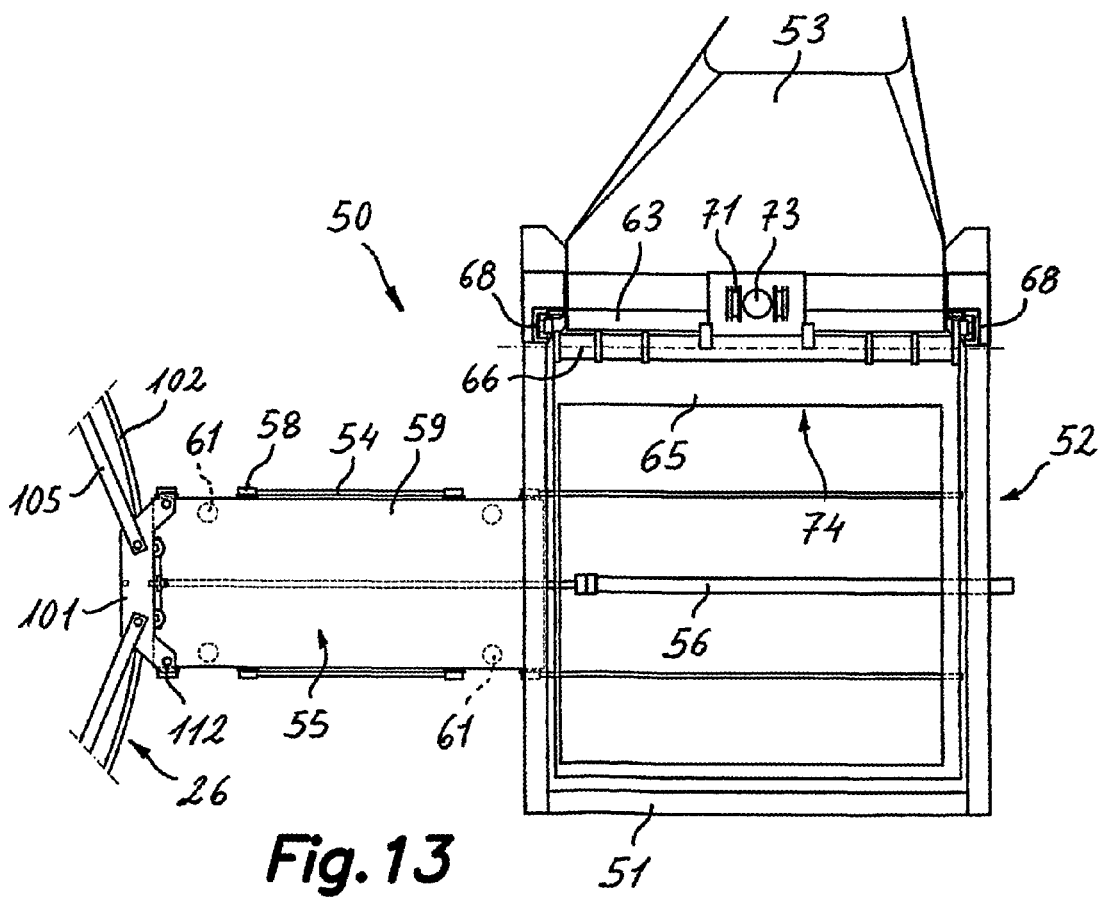
FIG. 13 is a part plan view of the lifting and tipping apparatus of the reloading unit of FIG. 1B, which is side tipplable.

The mentioned differences between the lifting/tippling apparatuses 52, 64, respectively tippling by the side and the front, lays specially in the fact that in the first case, illustrated in FIG. 13, the said structure face 51 ended by the said unloading ramp 53 and along which the rails 68 are fixed is a face contiguous to the said open face of the structure 51 and parallel to the said rails 54, so that such hinge 66 with respect of which tippling the quiescent tanks 24 is carried out is substantially perpendicular to the path 26. Such characteristic is useful namely for the reloading unit 50. due to the relative positions of the second hopper 44 and the rotating drum 22. It also would be useful for the transferring unit 60 to the feeding hopper 62 in the cases in which a scarce availability of space would require to place the hopper 62 very close to the path 26. In the second case, illustrated in FIG. 11, the said side face of the structure 51 ended by the said unloading ramp 53 and along which guides 68 are fixed is a face facing the said open face of the structure 51 and perpendicular to the said rails 54, therefore the said hinge 66 with respect to which tippling the quiescent tanks 24 is carried out is substantially parallel or tangent to the path 26. Such arrangement is useful for the transferring unit 60 to the feeding hopper 62 in the cases in which the availability of space allows to place such hopper 62 sufficiently apart from the path 26.

The said tippler 65 is also different in one and the other cases. FIG. 12 illustrates a tippler 65 corresponding to the lifting/tippling apparatus 64 tippling at the front. Such tippling apparatus 65 comprises a top part 72 having guides 57 horizontally arranged at a suitable height and adapted for receiving frames 69 (FIGS. 5 and 11) provided on the top part of the quiescent tanks 24 when a quiescent tank 24 is introduced within the structure 51 by the said displacing truck 55. The tippler 65 also comprises a side supporting wall 74 which is extending downwards from the said top part 72 and cooperating with the said guides 57 for supporting the quiescent tank 24 when it is tippled about the hinge 66. Typically, the guides 57 comprise good supporting surfaces at the lower part and only for best bearing the quiescent tank 24 when it is tippled, small supports at the top part, for example, in the form of a crossbar 78 at the front part and at least a stop 79 at the back part of the top 72. At the lower part of the side supporting wall 74 there are stops 124 which are embedded in frames corresponding to the lower part of the quiescent tanks 24 contributing to locking them with respect to the tippler 65.

Figure 12:
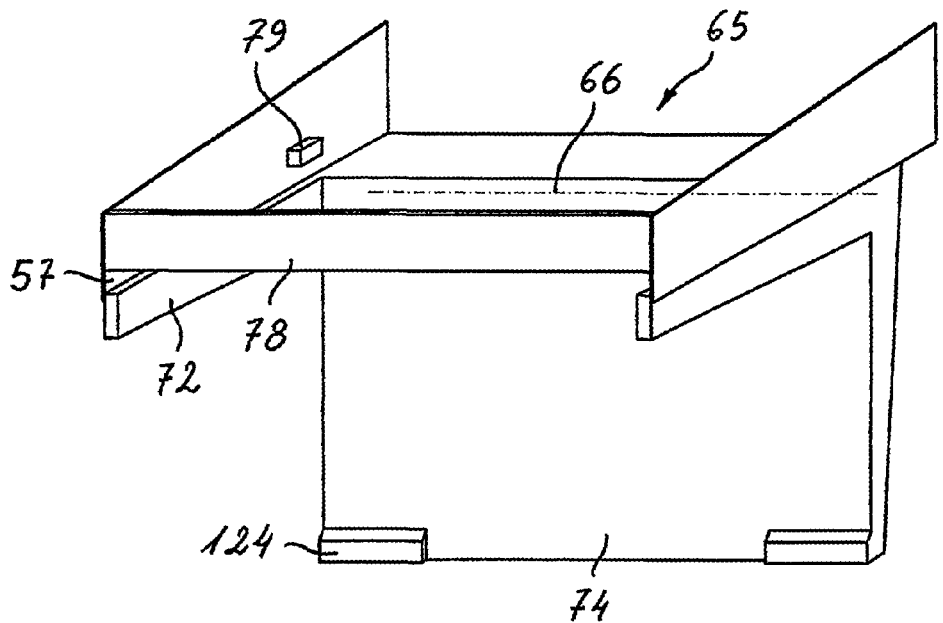
FIG. 12 is a view in perspective illustrating the tanks fastening means of the lifting and tippling apparatus of FIG. 11.

The tippler 65 corresponding the lifting/tippling apparatus 52, having a side tippling is shown in a plan view in FIG. 13 and comprises same elements as the tippler of FIG. 12, except that the guides 57 are parallel to the side supporting wall 74 and to the spin axis 66.

Figure 11:
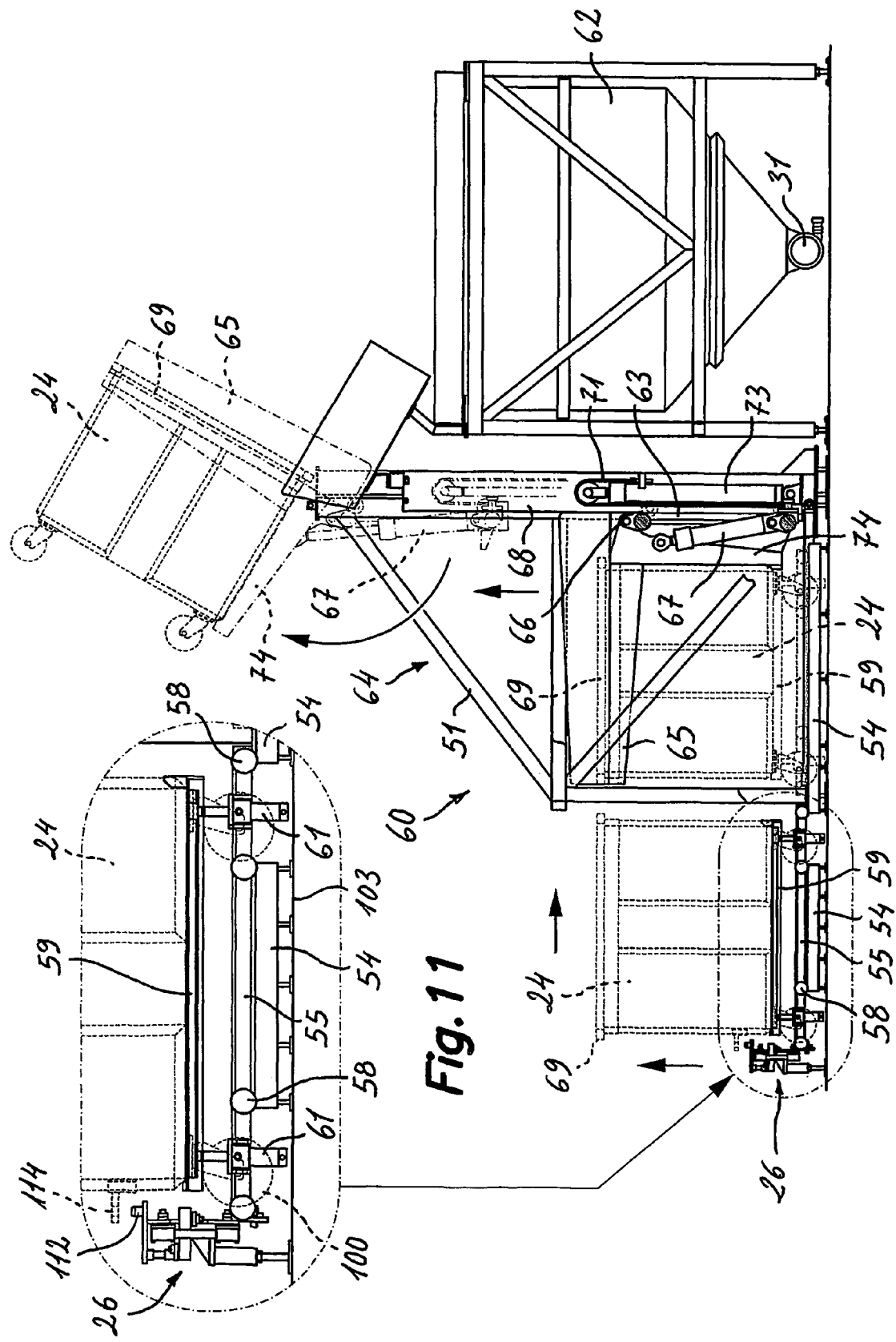
FIG. 11 is a part side elevation view, including an enlarged detail of the lifting and tippling apparatus of the unit transferring to the packaging hopper of FIG. 1B, such apparatus is tippled at the front part where dash lines show different positions taken by a quiescent tank from its stop position in the path to the tippled position on the top of the structure.

The lifting and tippling apparatus 64 of FIG. 11 transfers the load from the quiescent tanks 24 to the said hopper 62 of the transferring unit 60 to the feeding hopper 62, which comprises a single outlet 31 connected to a distributing device from which are starting two or more hoses 33 (shown in FIGS. 1A and 1B) connected to as many other dosing stuffing hoses 35 which has coupled a thermoforming 32 or a packaging machine 34, as required for the treated product. Each dosing stuffing hose 35 is provided with sucking means for taking by sucking it treated meat product from such hopper 62. Detecting means (not shown), such as optical detectors not shown control the filling/emptying level of such hopper 62.

With such arrangement, the plant of this invention can automatically operate in a non-stop operation under the control of the computer control centre, the operation steps of the said stations and units being coordinated so that at any moment of a working cycle, at least one of the stations is operating and there is a time provided for cleaning each station, unit or part thereof during such cycle.

What is claimed is:

1. Plant for treating and packaging meat product in a non-stop operation comprising:

a brine injection station (10) for the treatment of meat products;

a maceration station (20) for the injected meat products including at least a rotating massaging drum (22) for the injected meat product and a plurality of quiescent tanks (24) for the massaged meat products connected to drawing means for moving the tanks (24) forwards step-to-step along a closed path (26) around such rotating drum (22); and a packaging station (30) for the treated meat products such stations being coupled to each other for a non-stop operation, linked by a unit for accumulating and loading (40) the injected meat product in the rotating drum (22), located between an outlet of such injection station (10) and an inlet of the said maceration station (20), comprising: at least a first and a second hoppers (42, 44);

a distributing device (46) for distributing the meat product coming from the injection station (10) alternatively to the said first and second hoppers (42, 44);

a reloading unit (50) located between the said maceration station (20) and the said accumulating and loading unit (40) comprising means for newly transferring the massaged-settled meat product coming from the said quiescent tanks (24) to the said second hopper (44) to be reloaded in the said rotating drum (22); and a unit for transferring (60) the treated meat product to a feeding hopper (62) of the said packaging station (30),

17 in addition the plant includes a unit for cleaning (70) the quiescent tanks (24) at a point of the path (26) after the unit for transferring (60) and at least a computer control centre being provided for coordinating the steps of such stations and units operation so that at any moment of a plant working cycle at least one of such stations is operating, a time being provided for cleaning each station, unit or part thereof during the said cycle, keeping the plant in non-stop operation characterized in that the plant further comprises an inlet hopper (12) for accumulating lots of meat products to be treated, the said inlet hopper (12) being provided with first means for detecting the weight of the said lots and means (13) for feeding the meat products of each weighed lots to an injection machine (14) of the said injection station (10), means being incorporated at the said computer control centre to determine an amount of brine to be injected to each lot depending on the weight detected.

2. Plant, according to the claim 1, including a conveyor belt (11) for transferring the meat product from the outlet of the said injection machine (14) to the distributing device (46) of the accumulating and loading unit (40) and a tenderizing machine (15) associated to the said conveyor belt (11) to superficially cut the injected meat product before it is accumulated in the first and second hoppers (42, 44) and subsequently loaded in the rotating drum (22), the said conveyor belt (11) jointly with the said tenderizing machine (15) are mounted on a moving truck (16) displaceable between a working position and a cleaning position.

3. Plant according to claim 2, characterized in that the said moving truck (16) comprises, at one end, feet (36) provided with wheels and, at the other end, a sliding support (18) which may be movably retained on and be guided by at least one guide (19) horizontally fixed on a supporting structure (45) of the said first and second hoppers (42, 44), the said guide (19) has a first end corresponding to the working position and a second end (19a) sidewards protruding beyond the said supporting structure (45) corresponding to the cleaning position.

4. Plant according to claim 3, characterized in that, in the said working position, a first end (11a) of the conveyor belt (11) is located under the said outlet of the injection machine (14) and a second end (11b) of the conveyor belt (11) is located on an inlet of the said tenderizing machine (15), which is fixed to the moving truck (16) and an outlet from which it is located on the said distributing device (46) while at the said cleaning position, as well the conveyor belt (11) as the injection machine (14) are far away other components and structures and are fully accessible.

5. Plant, according to claim 1, characterized in that each of the said first and second hoppers (42, 44) of the accumulating and loading unit (40) have associated second weight detecting means and second control means incorporated to the said computer control centre for controlling the said distributing device (46) for distributing the meat product between the first and the second hoppers (42, 44) depending on a weight sought for each lot of injected meat product to be loaded subsequently in the said rotating drum (22).

6. Plant for treating and packaging meat product in a non-stop operation comprising:
 a brine injection station (10) for injection brine to the meat product to be treated;
 a maceration station (20) for the injected meat product including: a rotating massaging drum (22) for the injected meat product provided with a loading/unloading mouth (23) and means for tilting the said drum (22) in order to unload it through the said loading/unloading mouth (23);
 a plurality of quiescent tanks (24) for the massaged meat product connected to drawing means for moving the tanks (24) forwards step-to-step along a closed path (26) around such rotating drum (22); and
 a packaging station (30) for the treated meat products, wherein such stations are coupled to each other for a non-stop operation, linked by
 a unit for accumulating and loading (40) the injected meat product in the rotating drum (22), located between the outlet of such injection station (10) and the inlet of the said maceration station (20), comprising: at least a first and a second hoppers (42, 44); a distributing device (46) for distributing the meat product coming from the injection station (10) alternatively to the said first and second hoppers (42, 44); and
 transferring means (42a) for selectively transferring the load from the first and second hoppers (42, 44) into the rotating drum (22) of the maceration station (20),
 a reloading unit (50) located between the said maceration station (20) and the said accumulating and loading unit (40) comprising means for newly transferring the massaged-settled meat product coming from the said quiescent tanks (24) to the said second hopper (44) to be reloaded in the said rotating drum (22); and
 a unit for transferring (60) the treated meat product to a feeding hopper (62) of the said packaging station (30), located between a given point of the said path (26) of the maceration station (20) and the packaging station (30), including in addition a unit for cleaning (70) the quiescent tanks (24) at a point of the path (26) after the unit for transferring (60) and at least a computer control centre being provided for coordinating the steps of such stations and units operation so that at any moment of a plant working cycle at least one of such stations is operating, a time being provided for cleaning each station, unit or part thereof during the said cycle, keeping the plant non-stop operation characterized in that it comprises first loading and second massaging alternative automatic operation tops (21, 28) for such loading/unloading mouth (23) of such rotating drum (22), such tops (21, 28) having different characteristics for performing different functions depending on the steps in the working cycle:
 The first loading top (21) connected to a hose (25) directing the meat product coming from the said transfer means to the accumulating and loading unit (40) and mounted on a first moving arm (27) driven to switch over the said loading top (21) between an idle position, withdrawn from the said loading/unloading mouth (23) and a working position coupled to the loading/unloading mouth (23), when the drum (22) is stopped, to proceed to load by sucking due to a depression created by a vacuum pump within the drum (22) through a duct located at a blind axial end of the drum (22), opposed to the loading/unloading mouth (23); and
 The second massaging top (28) is mounted on a support (95) fixed on the free end of a second moving arm (29) driven to switch over the said second top (28) between an idle position, withdrawn from the said loading/unloading mouth (23), and a working position coupled to the loading/unloading mouth (23) either when the drum is stopped or rotating during a massaging sub-cycle, the said support (95) includes means to allow the massaging top (28) to rotate around a shaft (86) integral with it and to absorb small circular translations of the said shaft (86) when rotating jointly with the drum (22), due to possible misalignments between the shaft (86) and an actual spin axis of the drum (22).

7. Plant, according to claim 6, characterized in that adjacent to an outlet of the first and the second hoppers (42, 44) of the accumulating and loading unit (40) are located respective flow valves (42a, 44a), driven by respective fluid dynamic cylinders (47), the said flow valves (42a, 44a) are provided with departing respective hoses (49a, 49b) which are joined in a collector which offers a single common outlet mouth (49) connected to the said hose (25), means having being provided incorporated in the said computer control centre to selectively drive the said flow valves (42a, 44a) and controlling the said first moving arm (27) and vacuum pump to load the contents of either the first or the second hoppers (42, 44) in the rotating drum (22).

8. Plant according to claim 7 wherein a duct for conducting water and a hose for conducting detergent, supported on the said first moving arm (27) are connected to respective inlets of water and detergent (84, 85) of the said first loading top (21) for automatically cleaning the inside of the drum (22).

9. Plant according to claim 7, characterized in that the said first moving arm (27) comprises a structure of stiff bars (90) which form an arcuate shape along which remains delimited and protected an internal space through which is passing and supported a hose (25), such structure of stiff bars (90) is hinged by a first end (90a) distal from the said first loading top (21) to a supporting structure (45) of the said first and second hoppers (42, 44), and linked by a medium area (90b) with a fluid dynamic cylinder rod (91) a head of which is linked to such supporting structure (45), the said fluid dynamic cylinder (91) drives such first arm (27) to carry out such switching over between the said working and idle positions of the first loading top (21).

10. Plant according to claim 6, characterized in that the said shaft (86) integral with the massaging top (28) outwardly protrudes from it and is substantially aligned with the spin axis of the drum (22) when the massaging top (28) is in such working position, such shaft (86) being supported and guided by at least a bearing (87) housed in a bearing-holder (88) mounted on elastic bearing means (89) built in the said support (95) of the second moving arm (29), so that when the massaging top (28) rotates jointly with the drum (22) the said shaft (86) can rotate and make the said small circular translations with respect to the said second arm (28) against the strength of the said elastic means (89).

11. Plant according to claim 10, characterized in that the said elastic means comprise a plurality of helical springs (89) star-shaped radially arranged in housings of the said support (95) of the said free end of the second arm (29), external ends of the helical springs (89) being supported on adjustable depth bottoms (96) of the said housings and their internal ends being supported against the said bearing-holder (88), the strength of such springs (89) being adjustable by adjusting the depth of the related bottom (96) of the housing.

12. Plant, according to claim 10, characterized in that the said second moving arm (29) comprises at its ends distal from the massaging top (28) a hinge (29a) with respect to a tiltable supporting structure (92) of the said rotating drum (22) and a fluid dynamic cylinder (94) has a rod thereof linked to a cranked handle (93) integral with the hinge pin (29a) and a head linked to the said tiltable structure (92) the fluid dynamic cylinder (94) of which drives such second arm (29) to carry out the said switch over between the said working and idle positions of the second massaging top (21).

13. Plant for treating and packaging meat product in a non-stop operation of the kind comprising:
   a brine injection station (10) for injecting brine to the meat products to be treated;
   a maceration station (20) for the injected meat product including:
      a rotating massaging drum (22) for the injected meat product;
   a plurality of quiescent tanks (24) for the massaged meat products coming from the said rotating drum (22);
   drawing means to move the quiescent tanks (24) forwards step-to-step along a closed path (26) around such rotating drum (22), with a stop under the loading/unloading mouth (23) for receiving meat product from the said drum (22) and keep it settling during a predetermined time, the tanks (24), the tanks adapted to be unhooked off such drawing means at least in some predetermined stop positions; and
   a packaging station (30) for the treated meat products
   such stations are coupled to each other for a non-stop operation, linked by
   a unit for accumulating and loading (40) the injected meat product in the rotating drum (22), located between the outlet of such injection station (10) and the inlet of the said maceration station (20), comprising: at least a first and a second hoppers (42, 44); and transferring means for selectively transferring the load of the first and second hoppers (42, 44) to the rotating drum (22) of the maceration station (20),
   a reloading unit (50) located between the said maceration station (20) and the said accumulating and loading unit (40) comprising means for newly transferring the massaged-settled meat product coming from the said quiescent tanks (24) to the said second hopper (44) to be reloaded in the said rotating drum (22); and
   a unit for transferring (60) the treated meat product to a feeding hopper (62) of the said packaging station (30), located between a given point of the said path (26) of the maceration station (20) and the packaging station (30), including in addition a unit for cleaning (70) the quiescent tanks (24) at a point of the path (26) after the unit for transferring (60) at least a computer control centre being provided for coordinating the steps of such stations and units operation so that at any moment of a plant working cycle at least one of such stations is operating, a time being provided for cleaning each station, unit or part thereof during the said cycle, keeping the plant non-stop operation characterized in that such quiescent tanks (24) are provided with wheels (100) and can rotate on a track (103) arranged around the said rotating drum (22), each quiescent tank (24) is provided in addition with fastening means for releasably fasten a related drawing truck (101) guided along a rail (102) fixed on the floor, such rail (102) defining such closed cycle path (26) along such track (103) all such drawing trucks (101) being linked to each other by means of hinged bars (105) forming an endless flexible transmitting element along the said rail (102) driving, coupling and guiding means (106, 107, 108, 109) being provided for successively coupling each of such drawing trucks (101) when it is located in a predetermined position and moving it, drawing the rest of the drawing trucks (101) together with all the quiescent tanks (24) one step until the following drawing truck (101) occupies such predetermined stop position and then disconnect such drawing truck (101) and newly coming backwards to the predetermined position.

14. Plant, according to claim 13, characterized in that the said rail (102) comprises a flat faced handrail fixed on the floor having a cross sectional bigger size upright and the drawing truck (101) comprises at least supporting wheels (117) which rotates on the top face of the said handrail (102) and guiding wheels (118, 119), facing each other by pairs, with a wheel of each pair rotating on opposite sides of the handrail (102), one of the wheels (119) of each pair being mounted on a eccentric shaft (120) to facilitate its mounting adjustment.

15. Plant, according to claim 13, characterized in that the said driving, coupling and guiding means (106, 107, 108, 109) act on a length of the said path (26) in which the rail (102) defines a circumference arc (102*a*) with the beginning at the said predetermined position and comprise an arm (106), angularly moving, hinged at one end with respect to a vertical shaft (106*a*) located at the centre of the said circumference arc (102*a*) and guided by the opposite end (106*b*) with respect to a curved guide (107) parallel to the circumference arc (102*a*), a first fluid dynamic cylinder (108), having a long run, with its head hinged at a fixed point (108*a*) with respect to the floor and at the end of its rod linked to the said opposite end (106*b*) of the arm (106) and a second fluid dynamic cylinder (109), having a short run, fixed on the said opposite end (106*b*) of the arm (106), such second fluid dynamic cylinder (109) comprises, fixed at the end of its rod, a coupling element (110) which can be connected/disconnected in a complementary anchoring element (111) integral to each drawing truck (101) due to the said fluid dynamic cylinder rod (109) extending/retracting.

16. Plant, according to claim 15, characterized in that, at another point of the path (26) a locking element (116) is fixed to the end of the rod of another fluid dynamic cylinder (121) having a short run, which is in a fixed position and is driven for coupling the said locking element (116) with the said anchoring element (111) of a drawing truck (101) stopped in front of it in order to lock the assembly of quiescent tanks (24) during the periods in which they are stopped.

17. Plant, according to claim 13, characterized in that the said fastening means for releasably fastening a quiescent tank (24) on a related drawing truck (101) comprises a pair of upright stubs (112) integral with outwardly protruding platforms (113) in each drawing truck (101), such stubs (112) are socketed in holes (114) located in plates (115) horizontally protruding from a side of each quiescent tank (24) at a suitable height, means (55, 56, 59, 61) being provided for lifting the said quiescent tanks (24) sufficiently to disconnect the said holes (114) from the said stubs (112) and withdraw the quiescent tanks (24) from the said path (26) in the said predetermined stop positions.

18. Plant for treating and packaging meat product in a non-stop operation comprising:
 a brine injection station (10) for injecting brine to the meat product to be treated;
 a maceration station (20) for the injected meat products including a rotating massaging drum (22) for the injected meat product;
a plurality of quiescent tanks (24) for the massaged meat product coming from such rotating drum (22);
 drawing means to make such quiescent tanks (24) move forwards step-to-step along a closed path (26) around such rotating drum (22), with a stop under the loading/unloading mouth (23) for receiving meat product from the said drum (22) and keep it settling during a predetermined time, the tanks (24) adapted to be hooked off such drawing means at least in some predetermined stop positions; and
a packaging station (30) for the treated meat products,
such stations are coupled to each other for a non-stop operation, linked by
a unit for accumulating and loading (40) the injected meat product in the rotating drum (22), located between the outlet of such injection station (10) and the inlet of the said maceration station (20), comprising at least a first and a second hoppers (42, 44); and transferring means for selectively transferring the load of the first and second hoppers (42, 44) to the rotating drum (22) of the maceration station (20),
a reloading unit (50) located between the said maceration station (20) and the said accumulating and loading unit (40) comprising means for newly transferring the massaged-settled meat product coming from the said quiescent tanks (24) to the said second hopper (44) to be reloaded in the said rotating drum (22); and
a unit for transferring (60) the treated meat product to a feeding hopper (62) of the said packaging station (30), located between a given point of the said path (26) of the maceration station (20) and the packaging station (30), including in addition a unit for cleaning (70) the quiescent tanks (24) at a point of the path (26) after the transfer unit (60) and where the said accumulating and loading (40) and transferring (60) units include lifting-tippling apparatuses (52,64) provided with means for taking one of the quiescent tanks (24), filled, from a related stop position from the path (26), lifting and tippling it to transfer its contents to the said second hopper (44) of the accumulating and loading unit (40) or to the said hopper (62) of the transfer unit (60), respectively, and bring it back, empty, to the related stop position of the path (26), at least one computer control centre being arranged for coordinating the operation steps of the said stations and units so that at any moment of a working cycle of the plant at least one of the stations is operating, a time being provided for cleaning each station, unit or part thereof during the said cycle, keeping the non-stop operation of the plant, characterized in that, each of the said lifting-tippling apparatuses (52,64) comprises:
a structure (51), having a suitable height, open by one of its side faces leaning on the path (26), such structure (51) incorporating an unloading ramp (53) at the top end of another of its side faces;
means (55,56,59,61) for lifting one of such quiescent tanks (24) sufficiently to disconnect holes (114) located in plates (115) horizontally protruding from a side of the quiescent tank (24) from upright stubs (112) integral with platforms (113) associated to a corresponding drawing truck (101) of the quiescent tanks along the path (26) and transfer such quiescent tank (24) hooked off the path (26) to the inside of the structure bottom (51); and
means for fastening and uprightly lifting the quiescent tank (24) inside the said structure (51) and tippling it on the said unloading ramp (53) at the top end of the structure (51).

19. Plant, according to claim 18, characterized in that such means for lifting, disconnecting and transferring such quiescent tanks (24) from the path (26) to the inside of the structure bottom (51) comprise:
 rails (54) horizontally extending from inside the structure bottom (51) through the said open side face until crossing the said track (103) of the path (26) such rails (54) have interruptions at the passing areas for the said wheels (100) of the quiescent tanks (24);

a displacing truck (55) driven by a fluid dynamic cylinder (56) having a long run to horizontally move on the said rails (54) between a first position to a stop position of the quiescent tanks (24) on the path (26) and a second position inside the structure (51), such displacing truck (55) provided with at least three wheels (58) at each side arranged for rolling on the rails (54) so that when one of the said wheels (58) is located on one of such interruptions of the rails (54) at least two other wheels (58) are supported on the said rails (54);

an uprightly moving platform (59) mounted on the said displacing truck (55) and connected to the ends of the rods of fluid dynamic cylinders (61) uprightly fastened on the displacing truck (55) and driven for lifting the said moving platform (59) together with a quiescent tank (24) located on it, up to the said sufficient height, the said means (55, 56, 59, 61) being also capable of the opposite operation, consisting of a transferring a quiescent tank (24) emptied, at a slightly lifted position, from the fastening means inside the structure (51) bottom to the path (26), and going down the quiescent tank (24) for hooking it to the related drawing truck (101).

20. Plant, according to claim 18, characterized in that the said fastening and uprightly lifting and tippling means of the quiescent tank (24) comprise:

a lifting truck (63) located inside the said structure (51) and uprightly guided along guides (68) fixed on the said side face of the structure (51) ending in the said unloading ramp (53), the said lifting truck (63) adapted for going up and down on the said guides (68) driven by a chain mechanism (71) and a fluid dynamic cylinder (73);

a tippler (65) for a quiescent tank (24), such tippler being linked to a top part of the said lifting truck (63) by means of a substantially horizontal hinge (66) and linked by a point relatively far away from the said hinge (66) to the end of the fluid dynamic cylinder rod (67) the head of which is linked to a lower part of the lifting truck (63), when driving the said fluid dynamic cylinder (67) this causes that the quiescent tank (24) is tippled fastened on the said tippler (65) around the hinge (66) to empty its contents on the unloading ramp (53).

21. Plant, according to claim 20, characterized in that the said tippler (65) comprises a top part (72) having guides horizontally arranged and adapted for receiving frames (69) provided at the top part of the quiescent tanks (24) when a quiescent tank (24) is introduced inside the structure (51) by the said displacing truck (55) and a side supporting wall (74) which is extending downwards from the said top part (72) and which cooperates with such guides (57) for supporting the quiescent tank (24) when it is tippled about the hinge (66).

22. Plant, according to claim 18, characterized in that the said side face of the structure (51) ended by the said unloading ramp (53) and along which the guides (68) are fixed is facing the said open face of the structure (51) and perpendicular to the said rails (54), so that the said hinge (66) with respect to which the quiescent tanks (24) are tippled is substantially tangent to the path (26) and is useful for the unit (60) transferring to the feeding hopper (62) in the cases that the availability of space allows to place such hopper (62) far away the path (26).

23. Plant, according to claim 19, characterized in that the said face of the structure (51) ending by the said unloading ramp (53) and along which the guides (68) are fixed is a face contiguous to the said open face of the structure (51) and parallel to the said rails (54), so that such hinge (66) with respect to which tippling the quiescent tanks (24) is carried out is substantially perpendicular to the path (26) and is useful for the reloading unit (50), because of the relative positions of the second hopper (44) and rotating drum (22) as required, or from the transferring unit (60) to the feeding hopper (62) in the cases that a scarce availability of space requires that the said hopper (62) is placed very close to the path (26).

24. Plant, according to claim 22, characterized that the said hopper (62) of the transferring unit (60) comprises a single outlet (31) connected to a distributing device from which are starting a plurality of hoses (33) connected to an equal plurality of packaging machines (32, 34), which have sucking means for sucking the treated meat product from the said hopper (62) according to an inherent rating.

25. Plant according to claim 18, characterized in that the said cleaning unit comprises an automatic cleaning cabinet (77) arranged adjacent to a track (103) of the path (26) through which are moving the quiescent tanks (24) and a pivoting arm (76) hinged to the bottom of the said cabinet (77) such arm (76) having a lifting end with a concealable bottom frame on a portion of the said track (103) and a side supporting wall close to the said bottom frame, the said pivoting arm 76 being capable to rotate with respect to its hinge driven by a fluid dynamic cylinder for taking a quiescent tank (24) stopped on the said bottom frame and lift it unhooking it from its related drawing truck (101), on a circular path until introducing it laying on the said side supporting wall inside the automatic cleaning cabinet (77) for cleaning and subsequent returning of the cleaned quiescent tank to the path (26) and for newly hooking it to the drawing truck (101).

\* \* \* \* \*